(12) United States Patent
Hirabayashi et al.

(10) Patent No.: US 9,721,462 B2
(45) Date of Patent: Aug. 1, 2017

(54) TERMINAL DEVICE AND REMOTE CONTROL METHOD

(71) Applicant: Hitachi Maxell, Ltd., Ibaraki-shi, Osaka (JP)

(72) Inventors: Masayuki Hirabayashi, Ibaraki (JP); Hideo Nishijima, Ibaraki (JP); Yasunobu Hashimoto, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 14/904,784

(22) PCT Filed: Aug. 30, 2013

(86) PCT No.: PCT/JP2013/073393
§ 371 (c)(1),
(2) Date: Jan. 13, 2016

(87) PCT Pub. No.: WO2015/029231
PCT Pub. Date: Mar. 5, 2015

(65) Prior Publication Data
US 2016/0163190 A1    Jun. 9, 2016

(51) Int. Cl.
*G08C 19/16* (2006.01)
*G08C 17/02* (2006.01)
(Continued)

(52) U.S. Cl.
CPC .......... *G08C 17/02* (2013.01); *H04L 12/2816* (2013.01); *H04M 1/72533* (2013.01);
(Continued)

(58) Field of Classification Search
CPC ................ G08C 17/02; G08C 2201/93; G08C 2201/91; H04W 4/008; H04L 12/2816;
(Continued)

(56) References Cited

U.S. PATENT DOCUMENTS

| 2004/0121725 | A1  | 6/2004 | Matsui |
| 2010/0001893 | A1* | 1/2010 | Kim ............... G08C 17/02 341/176 |

(Continued)

FOREIGN PATENT DOCUMENTS

| JP | 2003-309884 A | 10/2003 |
| JP | 2004-166193 A | 6/2004 |
| JP | 2004-320209 A | 11/2004 |
| JP | 2006-279424 A | 10/2006 |
| JP | 2009-303014 A | 12/2009 |
| WO | 2012/070251 A1 | 5/2012 |

OTHER PUBLICATIONS

International Search Report of PCT/JP2013/073393.

*Primary Examiner* — Erin File
(74) *Attorney, Agent, or Firm* — Mattingly & Malur, PC

(57) ABSTRACT

A terminal device and a remote control method having high usability are provided. In a terminal device having a function for remote control of electric equipments, the current position and the current height of the terminal device are detected. In addition, an azimuth and an inclination toward which the terminal device is placed are detected. Furthermore, position information and height information of electric equipments to be controlled are stored, an electric equipment having the azimuth and the inclination toward which the terminal device is placed within predetermined ranges is selected by referring to information of the position, the height, the azimuth, and the inclination of the terminal device and information of the position and the height of the electric equipments, and the selected electric equipment is remotely controlled.

12 Claims, 34 Drawing Sheets

(51) Int. Cl.
*H04M 1/725* (2006.01)
*H04L 12/28* (2006.01)
*H04W 4/00* (2009.01)

(52) U.S. Cl.
CPC ........ *H04W 4/008* (2013.01); *G08C 2201/91* (2013.01); *G08C 2201/93* (2013.01); *H04L 2012/2841* (2013.01); *H04M 2250/12* (2013.01)

(58) Field of Classification Search
CPC ...... H04L 2012/2841; H04M 1/72533; H04M 2250/12; G06F 13/00; H04Q 9/00
See application file for complete search history.

(56) References Cited

U.S. PATENT DOCUMENTS

| | | | |
|---|---|---|---|
| 2011/0007901 A1 | 1/2011 | Ikeda et al. | |
| 2013/0021362 A1* | 1/2013 | Sakurada | G06F 3/038 345/589 |
| 2013/0102324 A1* | 4/2013 | Qiu | H04W 4/023 455/456.1 |
| 2014/0278075 A1* | 9/2014 | Fink | G01C 21/00 701/468 |
| 2015/0035762 A1* | 2/2015 | Lu | G06F 3/041 345/173 |
| 2015/0222862 A1* | 8/2015 | Lee | G08C 17/02 348/143 |

* cited by examiner

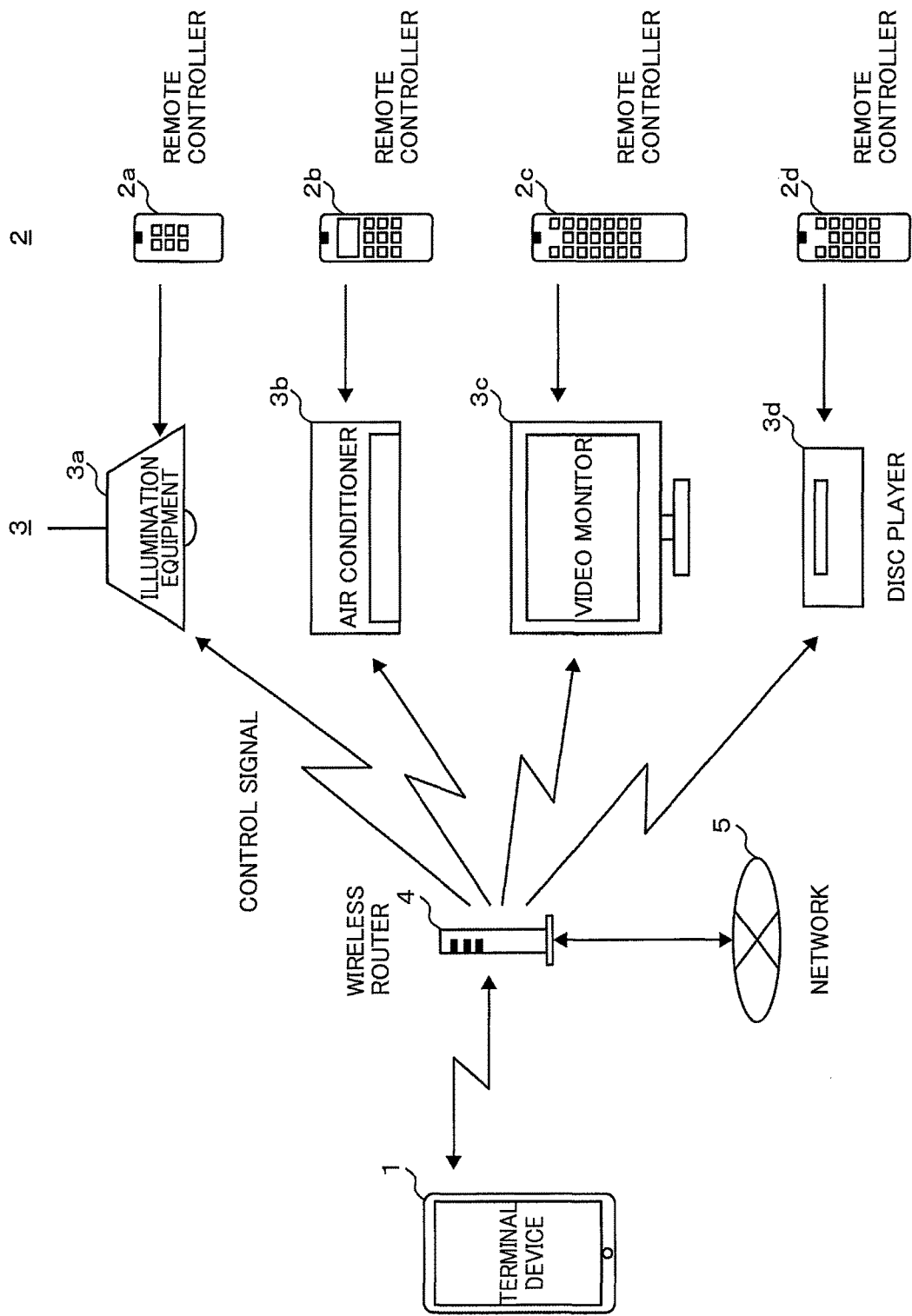

F I G. 2
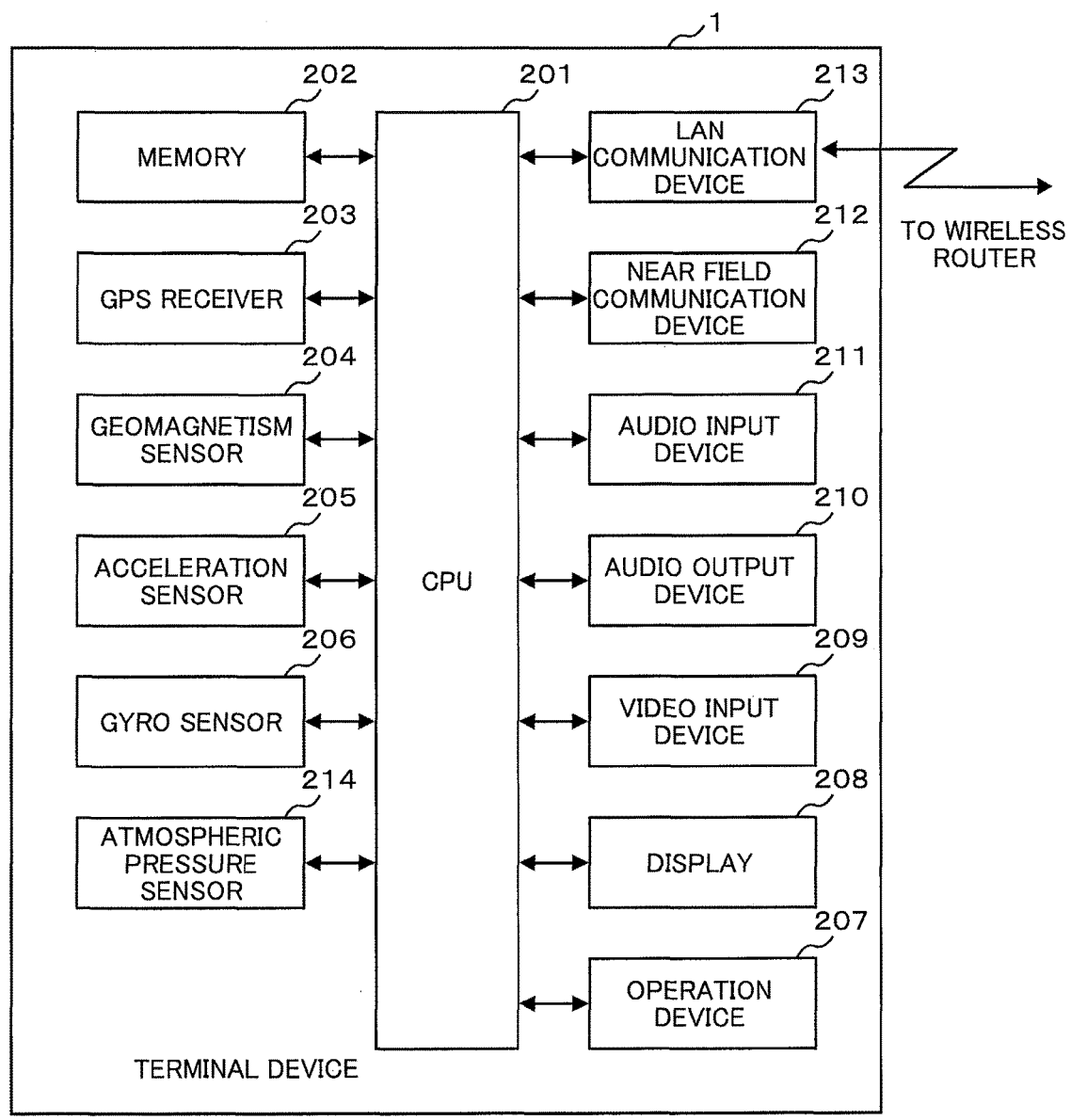

F I G. 1 1 A
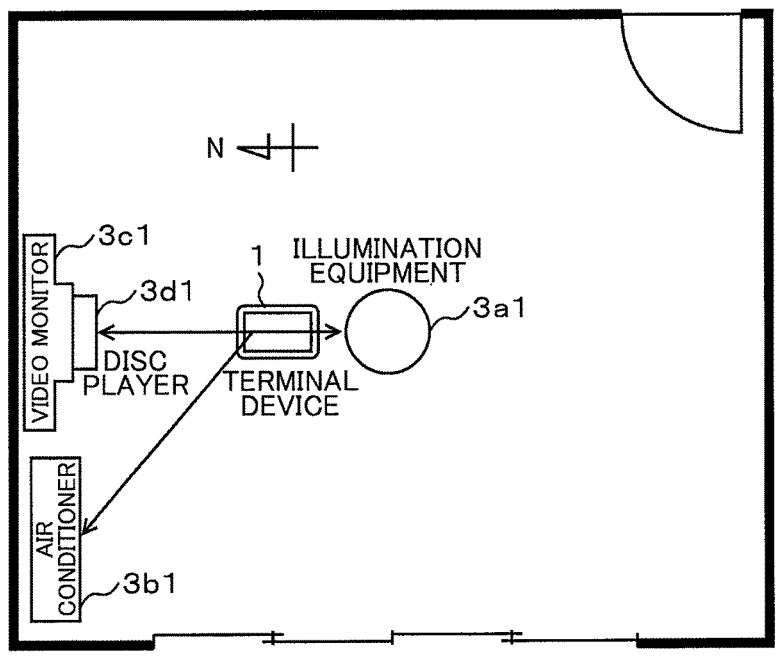
F I G. 1 1 B
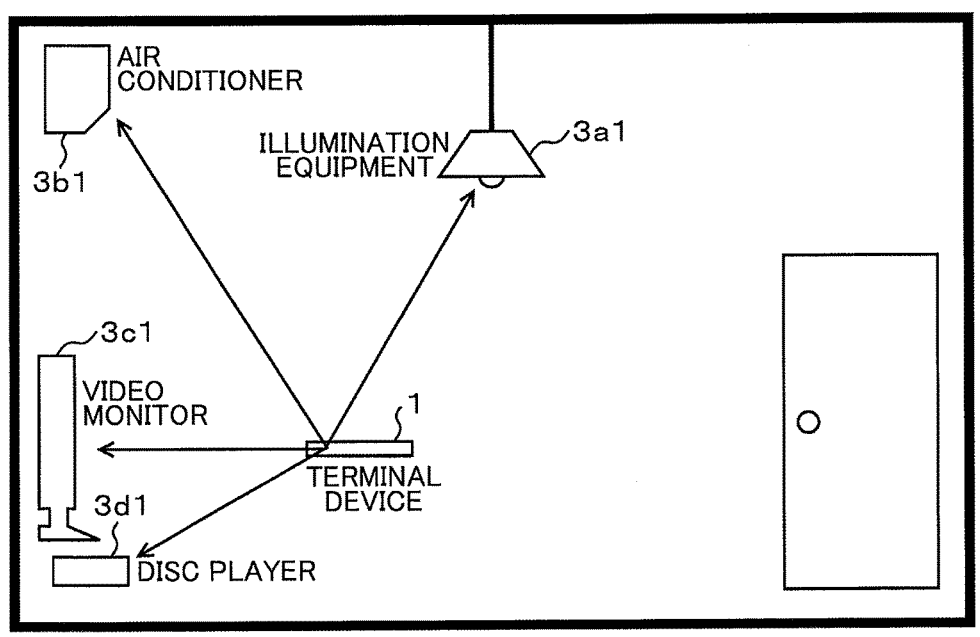

F I G. 1 2 A
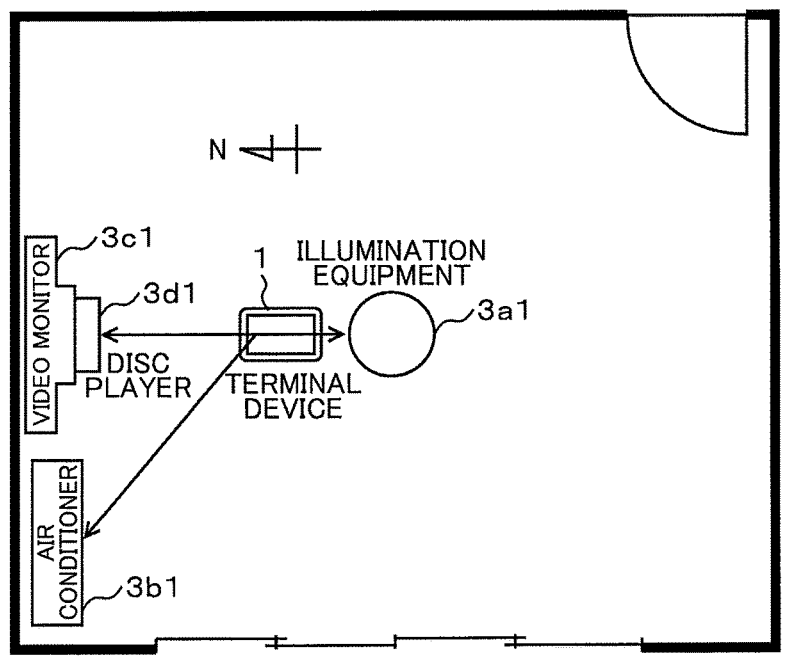
F I G. 1 2 B
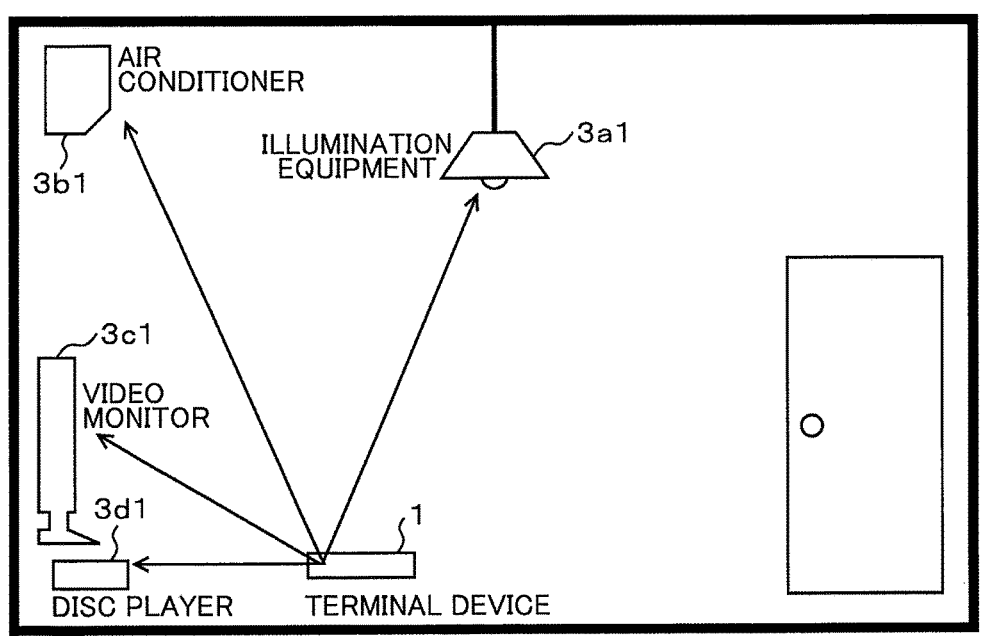

F I G. 1 3 A
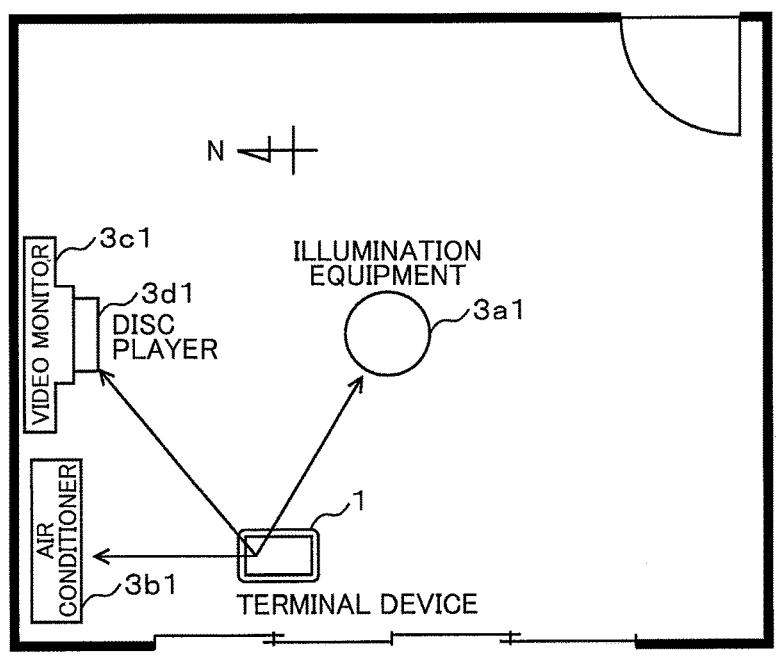
F I G. 1 3 B
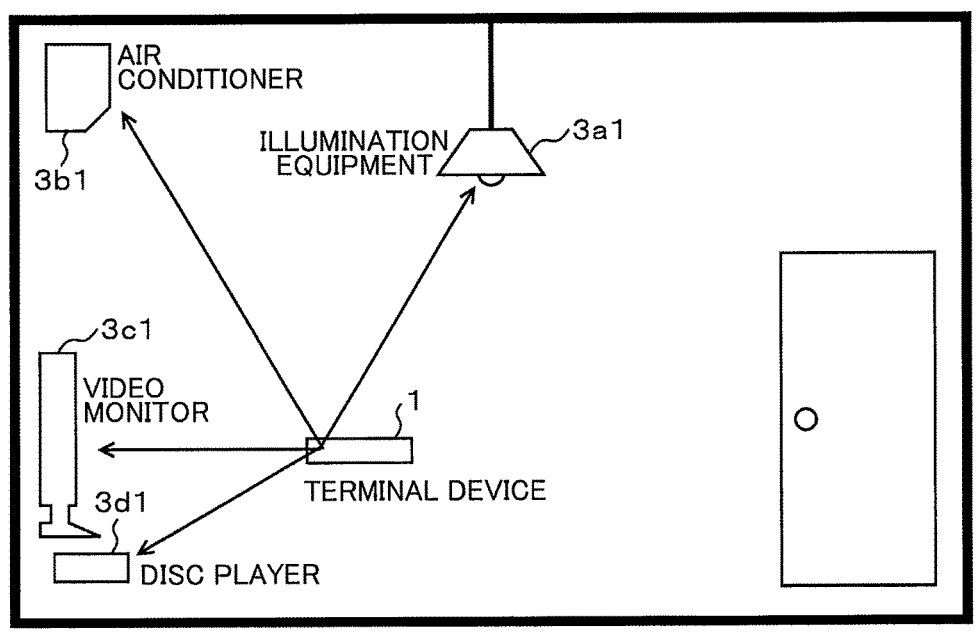

F I G. 1 4 A
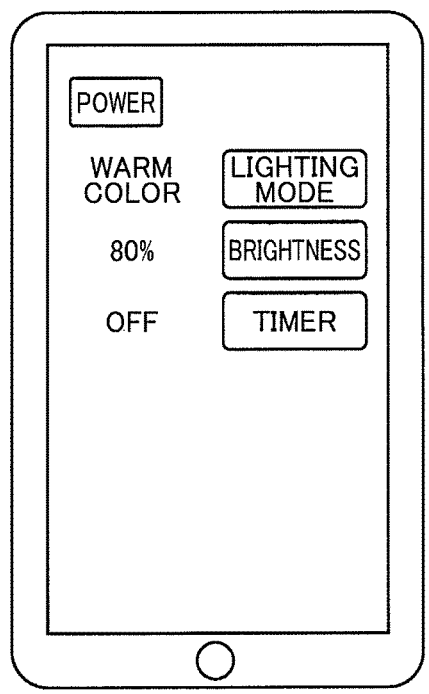
F I G. 1 4 B
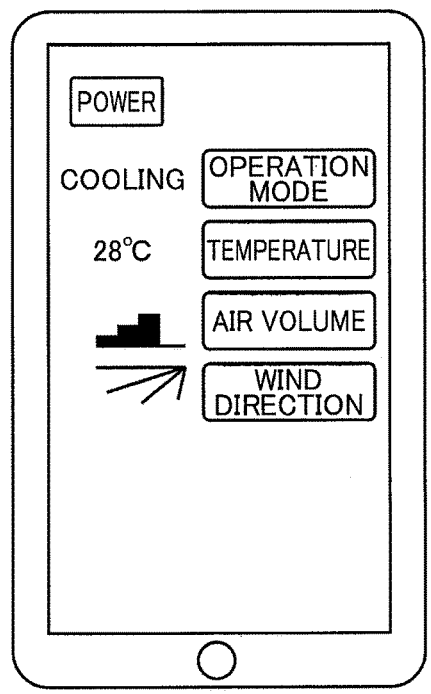

F I G. 1 7
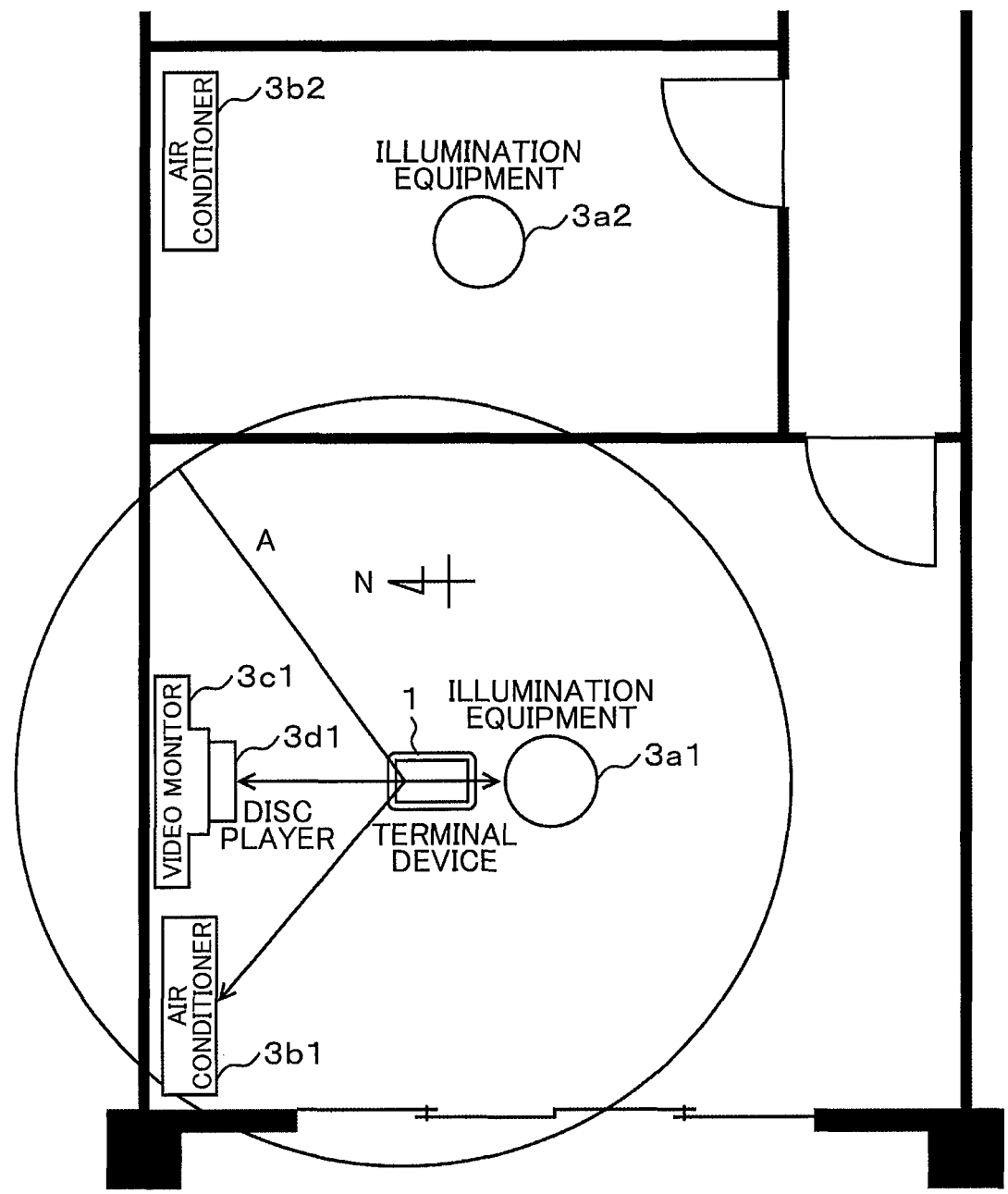

F I G. 1 9
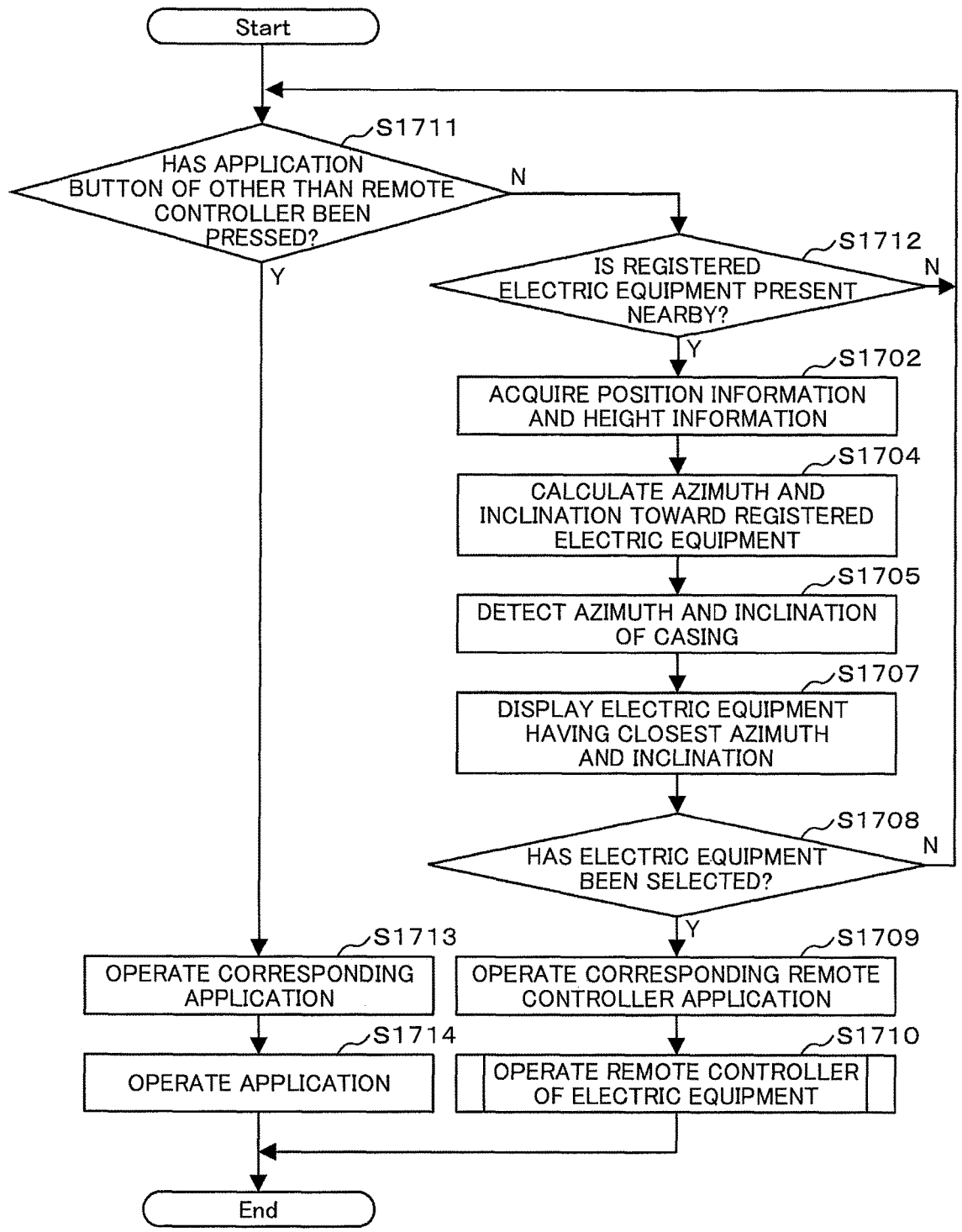

F I G. 2 0 C
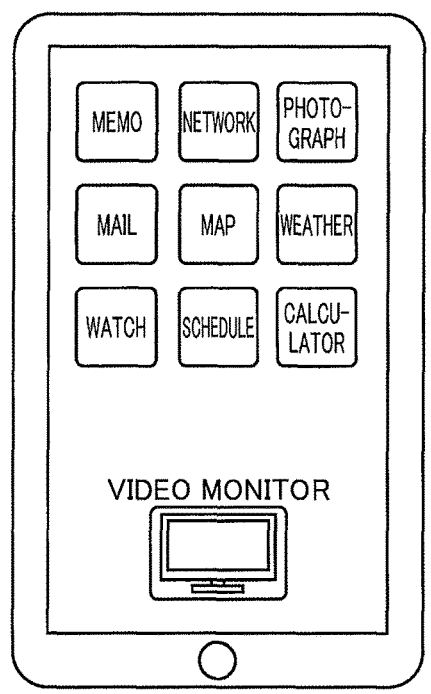
F I G. 2 0 D
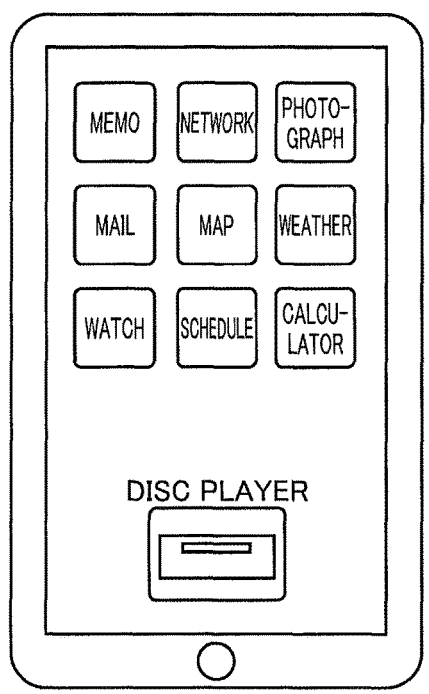

F I G. 2 3
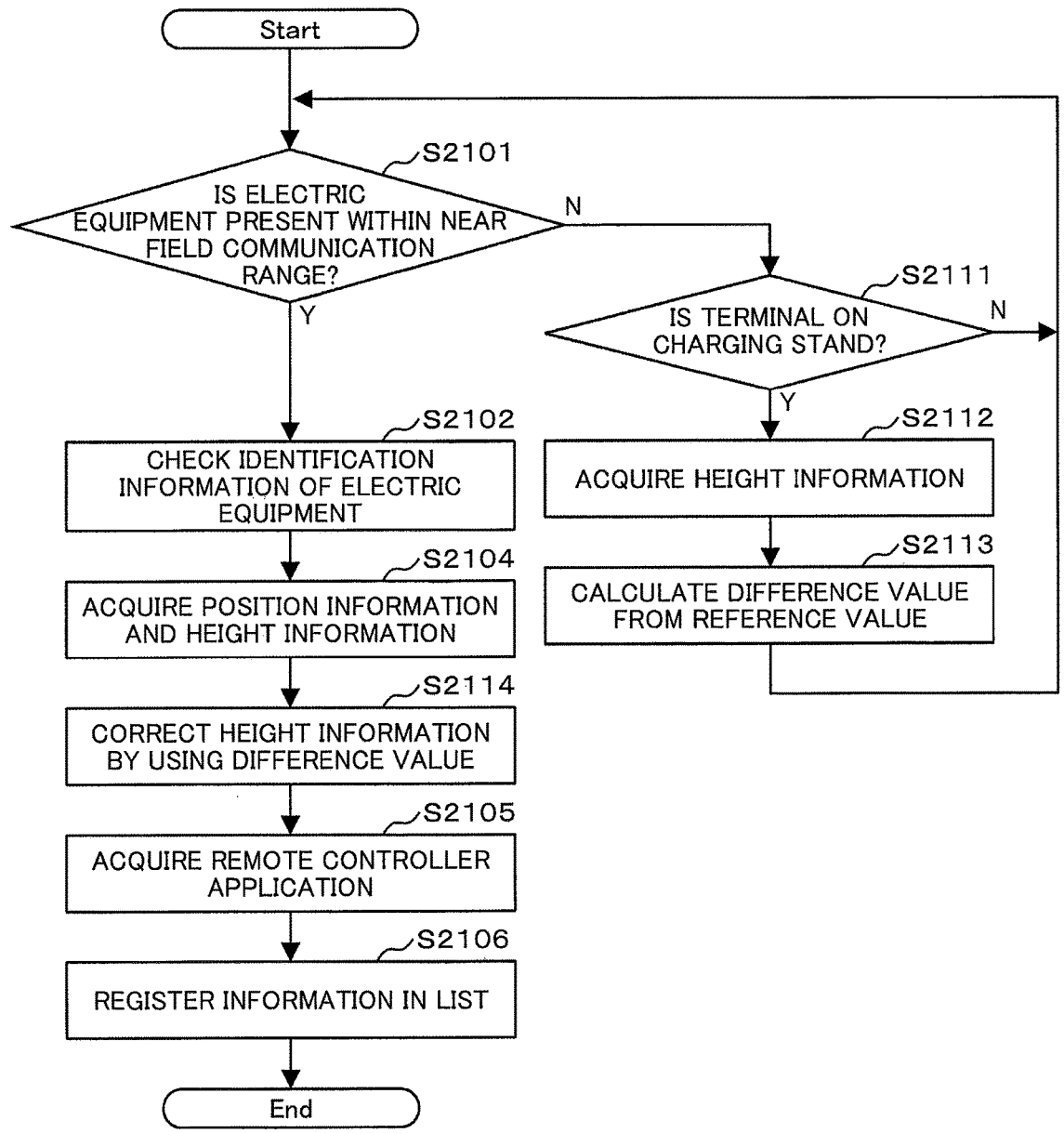

F I G. 2 5
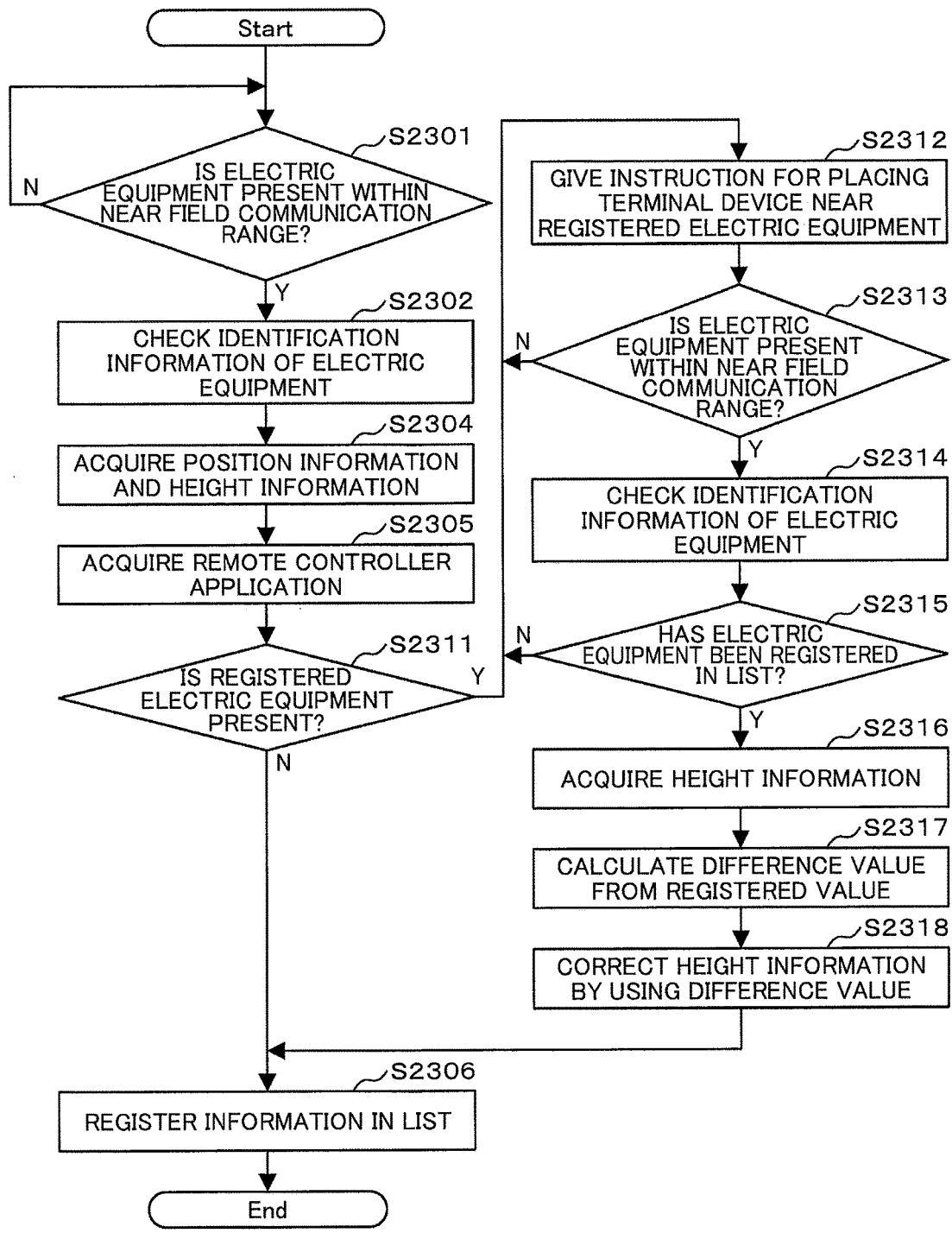

F I G. 2 7 A
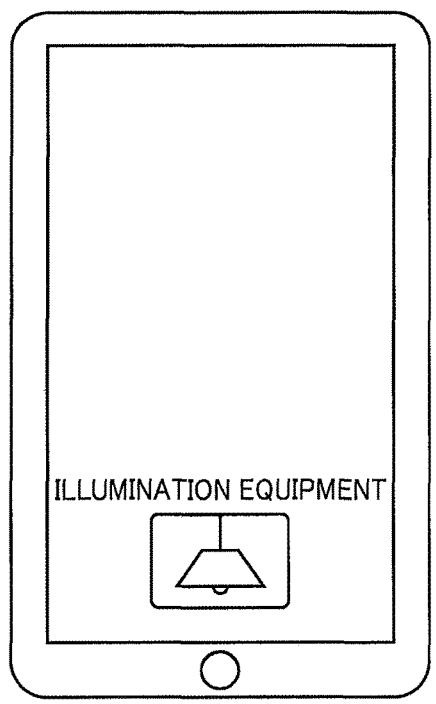
F I G. 2 7 B
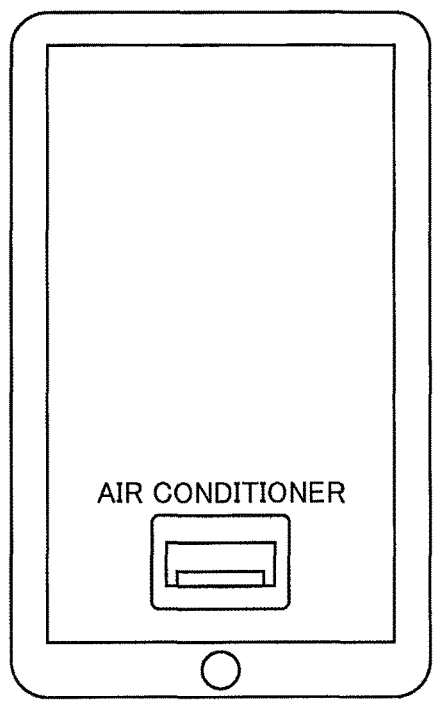

F I G. 2 7 C
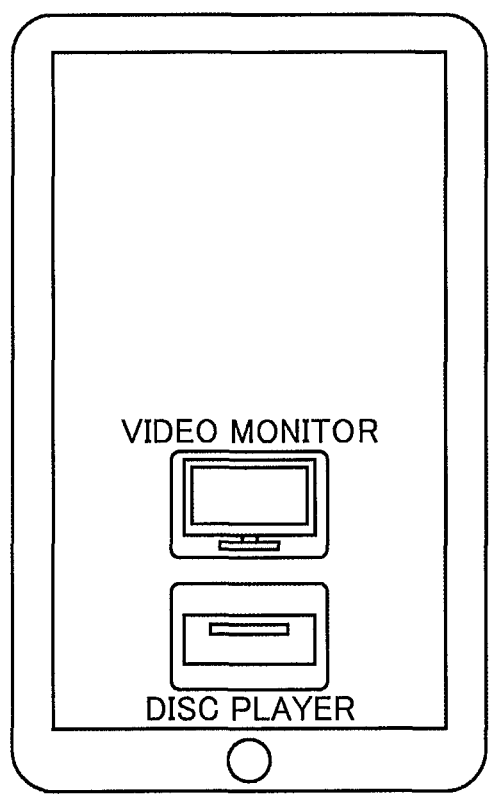

TERMINAL DEVICE AND REMOTE CONTROL METHOD

TECHNICAL FIELD

The present invention relates to a terminal device and a remote control method.

BACKGROUND ART

As a background technology of the present technology field, there is following Patent Literature 1. In the summary of this official gazette, the following is described as an object. "An electric equipment remote operation system that can operate an electric equipment using a remote controller regardless of presence/absence of an obstacle and has a simple configuration is provided".

As a means for achieving the object, the following is described. "This system is configured by a plurality of electric equipments, a management server integrally managing command information of the electric equipments, and one remote controller. The remote controller includes a direction detecting device, and an equipment selection table in which an arbitrary direction toward a front tip portion of the remote controller and each electric equipment are associated with each other is registered in the management server. When a user places the remote controller toward a predetermined direction, the direction detecting device detects the direction of the remote controller, and an electric equipment to be operated is selected based on the equipment selection table.

CITATION LIST

Patent Document

Patent Document 1: JP 2006-279424 A

SUMMARY OF THE INVENTION

Problems to be Solved by the Invention

In paragraph [0008] of the Patent Document 1 described above, the following effect is described. "According to this invention, a direction toward which a predetermined portion, for example, a tip end portion of the remote controller is placed is detected, and an electric equipment to be operated is selected based on the information, and accordingly, even an electric equipment arranged at a place blocked by an obstacle can be operated from the remote controller by downloading the command information from the management server.

However, in Patent Document 1, an azimuth of the remote controller toward each electric equipment is defined as one-to-one relation regardless of the actual position of the remote controller like an "azimuth of 45 degrees" for a television set, an "azimuth of 135 degrees" for a DVD recorder, and an "azimuth of 225 degrees" for an air conditioner. For this reason, the definition of the azimuth is valid only for a specific position of the remote controller, and there is an inconvenience that the definition becomes invalid when the remote controller is moved. Accordingly, it is expected to further improve the usability.

Thus, an object of the present invention is to provide a terminal device and a remote control method improving the usability.

Solutions to Problems

In order to achieve the object described above, for example, a configuration defined in the claim is employed.

While the present invention includes a plurality of means for achieving the objects described above, for example, according to the present invention, there is provided a terminal device that remotely controls electric equipments. The terminal device includes: a position information acquiring unit that acquires position information of the terminal device; a height information acquiring unit that acquires height information of the terminal device; an azimuth detecting unit that detects an azimuth toward which the terminal device is placed; an inclination detecting unit that detects an inclination of the terminal device; a storage unit that stores position information and height information of the electric equipments acquired from the electric equipments; and a control unit that remotely controls an electric equipment selected from a plurality of the electric equipments. The control unit: calculates azimuths of the electric equipments toward the terminal device based on the position information of the terminal device acquired by the position information acquiring unit and the position information of the electric equipments stored in the storage unit; calculates inclinations of the electric equipments toward the terminal device based on the height information of the terminal device acquired by the height information acquiring unit and the height information of the electric equipments stored in the storage unit; and compares the calculated azimuths with the azimuth, toward which the terminal device is placed, detected by the azimuth detecting unit, compares the calculated inclinations with the inclination of the terminal device detected by the inclination detecting unit, and selects the electric equipment having the azimuth and the inclination toward which the terminal device is placed within predetermined ranges with respect to the calculated azimuth and the calculated inclination as the electric equipment to be remotely controlled.

In addition, according to the present invention, there is provided a terminal device that remotely controls electric equipments. The terminal device includes: a position information acquiring unit that acquires position information of the terminal device; an azimuth detecting unit that detects an azimuth toward which the terminal device is placed; a storage unit that stores position information and height information of the electric equipments acquired from the electric equipments; and a user interface unit that displays information for a user; and a control unit that remotely controls an electric equipment selected from a plurality of the electric equipments. The control unit: calculates azimuths of the electric equipments toward the terminal device based on the position information of the terminal device acquired by the position information acquiring unit and the position information of the electric equipments stored in the storage unit; compares the calculated azimuths with the azimuth, toward which the terminal device is placed, detected by the azimuth detecting unit and displays information of images representing types of the electric equipments having the azimuth toward which the terminal device is placed within a predetermined range with respect to the calculated azimuths on the user interface unit to be aligned in order of the height information of the electric equipments stored in the storage unit; and selects the electric equipment selected from the display by the user as the electric equipment to be remotely controlled.

Furthermore, according to the present invention, there is provided a remote control method used in a terminal device that remotely controls electric equipments. The remote control method includes: acquiring position information of the terminal device; acquiring height information of the terminal device; detecting an azimuth toward which the terminal device is placed; detecting an inclination of the terminal device; storing position information and height information of the electric equipments acquired from the electric equipments; and remotely controlling an electric equipment selected from a plurality of the electric equipments. The remotely controlling of the electric equipment includes: calculating azimuths of the electric equipments toward the terminal device based on the position information of the terminal device acquired in the acquiring of the position information and the position information of the electric equipments stored in the storing of the position information and the height information; calculating inclinations of the electric equipments toward the terminal device based on the height information of the terminal device acquired in the acquiring of the height information and the height information of the electric equipments stored in the storing of the position information and the height information; and comparing the calculated azimuths with the azimuth, toward which the terminal device is placed, detected by the azimuth detecting unit, comparing the calculated inclinations with the inclination of the terminal device detected by the inclination detecting unit, and selecting the electric equipment having the azimuth and the inclination toward which the terminal device is placed within predetermined ranges with respect to the calculated azimuth and the calculated inclination as the electric equipment to be remotely controlled.

Effects of the Invention

According to the present invention, a terminal device and a remote control method improving the convenience can be provided, and there is an advantage that a user can control an electric equipment through a simple operation.

The other objects, configurations, and advantages will become apparent by describing the following embodiments.

BRIEF DESCRIPTION OF THE DRAWINGS

FIG. 1 is a diagram that illustrates the configuration of a remote control system according to a first embodiment.

FIG. 2 is a hardware configuration diagram of a terminal device according to the first embodiment.

FIG. 11A is a diagram that illustrates the arrangement of a room and the arrangement of electric equipments according to the first embodiment.

FIG. 11B is a diagram that illustrates the arrangement of a room and the arrangement of electric equipments according to the first embodiment.

FIG. 12A is a diagram that illustrates the arrangement of a room and the arrangement of electric equipments according to the first embodiment.

FIG. 12B is a diagram that illustrates the arrangement of a room and the arrangement of electric equipments according to the first embodiment.

FIG. 13A is a diagram that illustrates the arrangement of a room and the arrangement of electric equipments according to the first embodiment.

FIG. 13B is a diagram that illustrates the arrangement of a room and the arrangement of electric equipments according to the first embodiment.

FIG. 14A is an example of display of a touch panel of the terminal device according to the first embodiment.

FIG. 14B is an example of display of the touch panel of the terminal device according to the first embodiment.

FIG. 17 is a diagram that illustrates the arrangement of a room and the arrangement of electric equipments according to the second embodiment.

FIG. 19 is a flowchart that illustrates a process of selecting an electric equipment according to a fourth embodiment.

FIG. 20C is an example of display of a touch panel of the terminal device according to the fourth embodiment.

FIG. 20D is an example of display of a touch panel of the terminal device according to the fourth embodiment.

FIG. 23 is a flowchart that illustrates a process of registering an electric equipment according to a sixth embodiment.

FIG. 25 is a flowchart that illustrates a process of registering an electric equipment according to a seventh embodiment.

FIG. 27A is an example of display of a touch panel of a terminal device according to a seventh embodiment.

FIG. 27B is an example of display of a touch panel of the terminal device according to the seventh embodiment.

FIG. 27C is an example of display of a touch panel of the terminal device according to the seventh embodiment.

MODE FOR CARRYING OUT THE INVENTION

Figure 3:
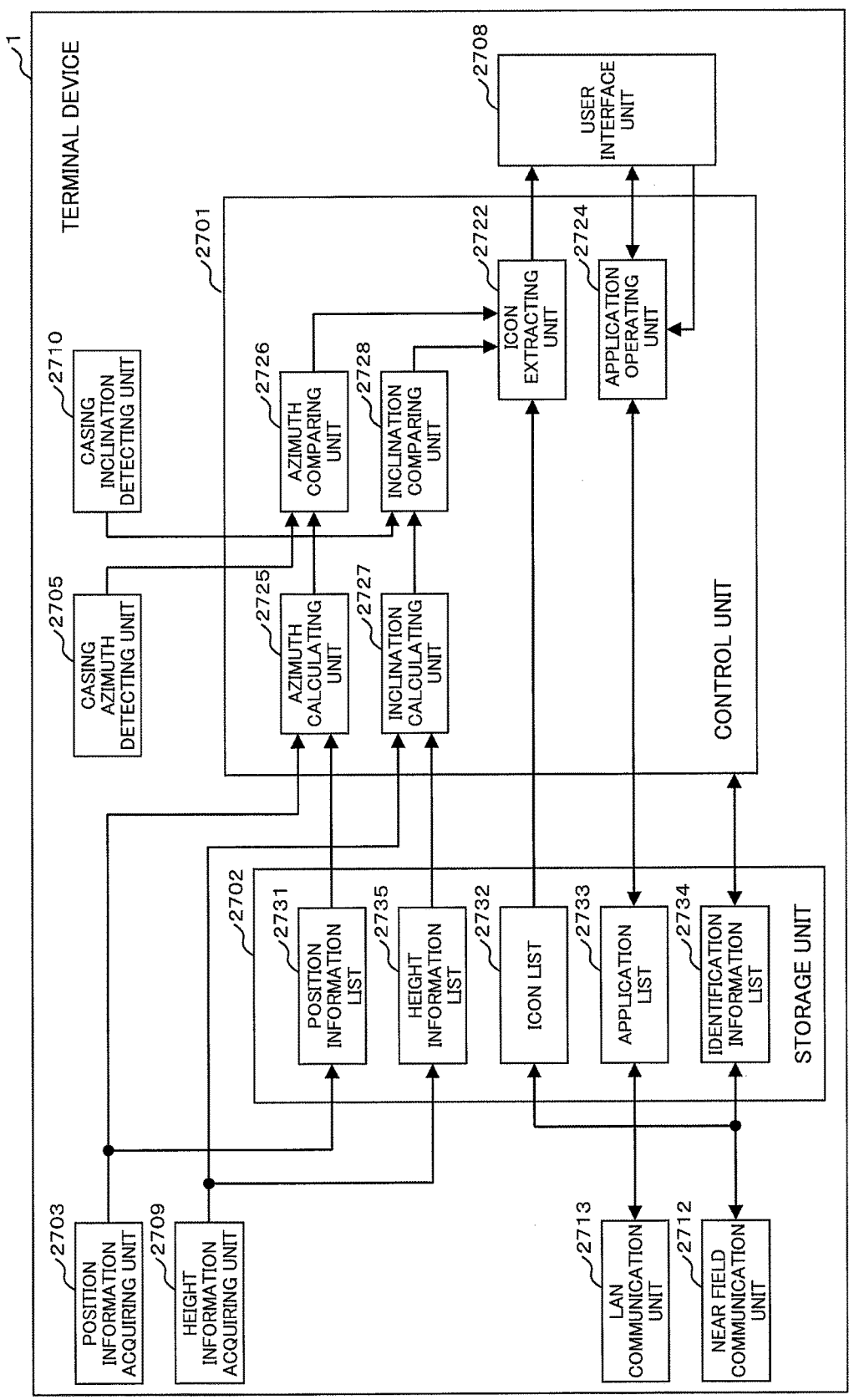
FIG. 3 is a functional block diagram of the terminal device according to the first embodiment.

Hereinafter, embodiments will be described with reference to drawings.

[Embodiment 1]

FIG. 1 is a diagram that illustrates the configuration of a remote control system according to a first embodiment. The remote control system according to this embodiment includes at least one terminal device and a plurality of electric equipments.

The terminal device 1 has a radio communication function and can transmit and receive various kinds of information from an Internet network. In addition, the terminal device 1 has a function for executing remote control of electric equipments 3, and a user can execute remote control of electric equipments 3 such as an illumination equipment 3a, an air conditioner 3b, a video monitor 3c, and a disc player 3d through a wireless router 4 to be described later or can directly execute the remote control not through the wireless router 4. Here, as electric equipments to be remotely controlled, while the illumination equipment, the air conditioner, and the like are described as examples, other equipments may be used as the electric equipments as long as they use electricity for at least a part of the control process, and the electric equipments may be a gas equipment such as a gas stove or a gas cooker, an electric lock, a vehicle, and the like.

The remote controller (hereinafter, referred to as a "remote controller") 2 is a control device that is dedicatedly used for each electric equipment 3 and can execute remote control of a corresponding electric equipment using infrared light or the like. A remote controller 2a is a remote controller that is dedicatedly used for the illumination equipment 3a, a remote controller 2b is a remote controller that is dedicatedly used for the air conditioner 3b, a remote controller 2c is a remote controller that is dedicatedly used for the video monitor 3c, and a remote controller 2d is a remote controller that is dedicatedly used for the disc player 3d.

The on/off and the brightness level of the illumination equipment 3a can be set by using the terminal device 1 or the remote controller 2a. The on/off, the mode, and the temperature of the air conditioner 3b can be set by using the terminal device 1 or the remote controller 2b. The on/off, the channel, and the volume of the video monitor 3c can be set by using the terminal device 1 or the remote controller 2. The video monitor 3c is a device that receives and displays a video content and, for example, can receive a television signal from a broadcasting station in a wireless or wired manner and display a video content based on the television signal. In addition, the video monitor 3c can display a video content such as an internet content of a Uniform Resource Locator (URL) designated by a user or the like received from a network 5 through the wireless router 4. The disc player 3d can play an audio or a video from a Compact Disc (CD), a Digital Versatile Disc (DVD), a Blu-ray Disc (BD (registered trademark)), or the like and, for example, can output the audio or the video to the video monitor 3c or can execute play, stop, selection of music, or the like by using the terminal device 1 or the remote controller 2d.

The wireless router 4 has a wireless Local Area Network (LAN) function such as Wireless Fidelity (Wi-Fi) or the like and can be connected to the network 5 through a communication line. The terminal device 1 or the video monitor 3c, by being connected to the wireless router 4, can acquire a video content or various kinds of information from the Internet network and display the video content or various kinds of information that has been acquired.

FIG. 2 is a hardware configuration diagram of the terminal device 1 illustrated in FIG. 1.

The terminal device 1 may be a mobile phone, a smartphone, a tablet terminal, or the like or may be a Personal Digital Assistants (PDA) or a notebook Personal Computer (PC). Furthermore, the terminal device 1 may be a music player having a communication function, a digital camera, a mobile game device, or the like or any other mobile digital device.

Each unit of the terminal device 1 is controlled by a Central Processing Unit (CPU) 201. The CPU 201 may be one of various control circuits or a dedicated circuit such as an Application Specific IC (ASIC) and controls the entire terminal device 1 according to a predetermined program.

The memory 202 is configured by a Read Only Memory (ROM), a Random Access Memory (RAM), a flash ROM, and the like and stores a program used for controlling the terminal device 1, various set values, and the like.

A Global Positioning System (GPS) receiver 203 includes an antenna, a decoding circuit, and the like and is a receiver of a global positioning system that can receive electric waves from satellites and detect global position information of the terminal device 1.

In addition, the GPS receiver 203 can receive correction signals of the GPS satellites from a base station and increase the positional accuracy by using a Differential GPS (DGPS) correcting GPS information. Furthermore, the GPS receiver 203 can receive a correction signal from a global synchronization orbit satellite and further increase the positional accuracy by using a Quasi-Zenith Satellite System (QZSS) complementing and reinforcing the GPS information.

In addition, by using an Indoor Messaging system (IMES) receiving a signal that is compatible with a GPS satellite from an indoor GPS transmitter and acquiring position information, indoor/outdoor seamless positioning can be executed.

A geomagnetism sensor 204, an acceleration sensor 205, a gyro sensor 206 form a sensor group used for detecting the posture or the motion of the casing of the terminal device 1, and, by using such a sensor group, various kinds of information such as the position, the azimuth, the orientation, and the motion, and the like of the terminal device 1 can be detected.

An atmospheric pressure sensor 214 is a sensor used for detecting the atmospheric pressure of the periphery of the terminal device 1, and, by using this sensor, the height information and the like of the terminal device 1 can be detected. Another sensor may be further included.

An operation device 207, for example, is a touch pad and receives a user's operation and transmits an instruction that is based on the operation to the CPU 201.

A display 208, for example, is a liquid crystal panel and displays various kinds of information. Generally, a unit acquired by combining a liquid crystal panel and a touch pad to be integrated together is called a touch panel, and, also in this embodiment, an example using the touch panel is described.

A video input device 209, for example, is a camera, and, by converting light input from a lens into an electric signal, image data of the periphery and a target object can be input.

An audio output device 210, for example, is an amplifier and a speaker and can output various kinds of audio.

An audio input device 211, for example, is a microphone and can convert a user's sound or the like into audio data and input the audio data.

A near field communication device 212, for example, executes near field wireless communication such as Near Field Communication (NFC), and, by only causing the near field communication device to approach a target object that is in compliance with the wireless communication standard, input/output of various kinds of data can be executed.

A LAN communication device 213 can acquire various kinds of information from the Internet network through the wireless router 4 or the like, for example, by using Wi-Fi or the like. In addition, by transmitting/receiving a control command, a status, and the like to/from the electric equipment 3 through the wireless router 4 or the like, the electric equipment 3 can be remotely controlled. Furthermore, the LAN communication device 213 may directly transmit/receive a control command, a status, and the like to/from the electric equipment 3 not through the wireless router 4 or the like, for example, by using Wi-Fi Direct, Bluetooth (registered trademark), or the like. In addition, the LAN communication device 213 can detect position information according to a connection status of a connection with a wireless router of each place.

Each of the near field communication device 212 and the LAN communication device 213 includes an antenna, an encoding circuit, a decoding circuit, and the like.

FIG. 3 is a functional block diagram of the terminal device 1 according to the first embodiment. Each functional block of the terminal device 1, for example, is controlled to operate by the CPU 201 included in the terminal device 1 illustrated in FIG. 2.

The control unit 2701 includes: an icon extracting unit 2722; an application operating unit 2724, an azimuth calculating unit 2725; an azimuth comparing unit 2726; an inclination calculating unit 2727; and an inclination comparing unit 2728 and executes registration of electric equipments 3 before the use of the remote controller, selection of an electric equipment 3 at the time of using the remote controller, and control of the remote controller by controlling a storage unit 2702, a position information acquiring unit 2703, a height information acquiring unit 2709, a casing azimuth detecting unit 2705, a casing inclination detecting unit 2710, a near field communication unit 2712, a LAN communication unit 2713, and the like based on an instruction transmitted from a user interface unit 2708.

The user interface unit 2708 represents various kinds of information to a user, for example, by using the display 208, the audio output device 210 or the like illustrated in FIG. 2 and transmits a user instruction from the operation device 207, the video input device 209, the audio input device 211, and the like to the control unit 2701.

The position information acquiring unit 2703 acquires position information, for example, by using the GPS receiver 203, the acceleration sensor 205, the LAN communication device 213, or the like illustrated in FIG. 2. The height information acquiring unit 2709 acquires height information, for example, by using the atmospheric pressure sensor 214, the acceleration sensor 205, or the like illustrated in FIG. 2. The casing azimuth detecting unit 2705 detects the azimuth of the casing, for example, by using the geomagnetism sensor 204, the gyro sensor 206, or the like illustrated in FIG. 2. The casing inclination detecting unit 2710 detects the inclination of the casing, for example, by using the gyro sensor 206, the acceleration sensor 205, and the like illustrated in FIG. 2. The position information, the height information, the azimuth, and the inclination may be detected by using any other sensor or by additionally using any other sensor.

For example, in a case where the height information is acquired by using the atmospheric pressure sensor 214, the acceleration sensor 205, or the like, there is an influence of the surrounding environment, and accordingly, it is difficult to acquire an elevation value, for example, having a sea level as the reference with high accuracy. However, in this embodiment, the elevation value is not necessary, and a difference between relative heights of the terminal device 1 and the electric equipment 3 or a difference between relative heights thereof having the face of the floor of a room or a charging stand to be described later as the reference may be detected. In addition, as will be described later, by correcting one of two pieces of height information acquired before a change in the surrounding environment starting from the atmospheric pressure and acquired after that, a difference between the relative heights can be detected without receiving an influence of the change in the surrounding environment. Accordingly, the height information acquiring unit 2709 according to this embodiment can detect the necessary height information. A height of an electric equipment such as an indoor unit of an air conditioner with respect to the face of the floor is frequently about 2 m, and the electric equipment 3 may be configured to have a predetermined value as a default value of the height information and supply the predetermined value to the terminal device 1.

By approaching the near field communication unit of the electric equipment 3 or the like, the near field communication unit 2712 starts near field communication and can execute input/output of various kinds of data for the electric equipment 3. Alternatively, by approaching an NFC tag or the like, the near field communication unit 2712 may start near field communication and execute input of various kinds of data from the NFC tag.

Before the use of the remote controller, the control unit 2701 acquires information that is necessary for remotely controlling the electric equipment 3 and registers the acquired information in the storage unit 2702. First, the control unit 2701 acquires identification information representing the kind, the type name, the serial number, and the like of the electric equipment 3, an icon (display image), a URL of a remote controller application, and the like through the near field communication unit 2712 and stores the acquired information in an identification information list 2734 and an icon list 2732 of the storage unit 2702. Simultaneously, the control unit 2701 acquires the position information of the electric equipment 3 by using the position information acquiring unit 2703 and stores the acquired position information in a position information list 2731 of the storage unit 2702. In addition, the control unit 2701 acquires the height information of the electric equipment 3 by using the height information acquiring unit 2709 and stores the acquired height information in a height information list 2735 of the storage unit 2702. Furthermore, the control unit 2701 acquires the remote controller application according to the URL from the network 5 through the LAN communication unit 2713 and stores the acquired remote controller application in an application list 2733 of the storage unit 2702.

Here, the remote controller application is application software used for remotely controlling the electric equipment 3. In the list of the storage unit 2702, a plurality of electric equipments 3 can be registered, and position information, height information, an icon, a remote controller application, and the like are registered therein in association with each identification information.

In other words, in a case where information that is necessary for remotely controlling the electric equipment 3 is registered before the remote controller is used, the identification information, the icon, the URL of the remote controller application, and the like are acquired by using the near field communication (NFC). In a case where the electric equipment 3 is located at a position at which it is difficult for the electric equipment 3 to execute near field communication for the terminal device 1, the information described above is acquired from the NFC tag placed at a position to be described later. In this way, various kinds of information can be acquired more easily than a case where a user searches and acquires various information by using a LAN (Wi-Fi). In addition, also when a remote controller application is registered, while there is a method of directly acquiring information by using near field communication, however, here, by using a LAN, a remote controller application that may be frequently configured to have a large capacity can be easily registered.

When the remote controller is used, the control unit 2701 selects an electric equipment 3 to be remotely controlled among electric equipments 3 registered in the storage unit 2702. First, the position information of the terminal device 1 is acquired by using the position information acquiring unit 2703, and an azimuth (an azimuth angle from the terminal device 1 toward the electric equipment 3) is calculated by comparing the acquired position information with the position information of all the electric equipments 3 included in the position information list 2731 by using the azimuth calculating unit 2725. Simultaneously, height information is acquired by using the height information acquiring unit 2709, and an inclination (an elevation angle from the terminal device 1 to the electric equipment 3) is calculated by comparing the acquired height information with the height information of all the electric equipments 3 included in the height information list 2735 by using the inclination calculating unit 2727.

Next, the azimuth of the casing of the terminal device 1 is detected by using the casing azimuth detecting unit 2705, and the detected azimuth is compared with each azimuth from the terminal device 1 toward each electric equipment 3 by using the azimuth comparing unit 2726. Simultaneously, the inclination of the casing of the terminal device 1 is detected by using the casing inclination detecting unit 2710, and the detected inclination is compared with each inclination from the terminal device 1 toward each electric equipment 3 by using the inclination comparing unit 2728.

Next, based on a result of the comparison described above, an icon of the electric equipment 3 located in the direction of an azimuth and an inclination that are closest to the azimuth and the inclination of the casing is extracted from the icon list 2732 by using the icon extracting unit 2722, and the extracted icon is displayed on the user interface unit 2708.

Then, in a case where the icon displayed on the user interface unit 2708 is the icon of a desired electric equipment 3, the user selects the icon, and the application operating unit 2724 operates a remote controller application corresponding to the icon that is included in the application list 2733. On the other hand, in a case where the icon displayed on the user interface unit 2708 is not the icon of the desired electric equipment 3, the user changes the azimuth or the inclination of the casing of the terminal device 1 such that the icon of the desired electric equipment 3 is displayed.

In this way, the user can remotely control the desired electric equipment 3 by using the terminal device 1.

Figure 4:
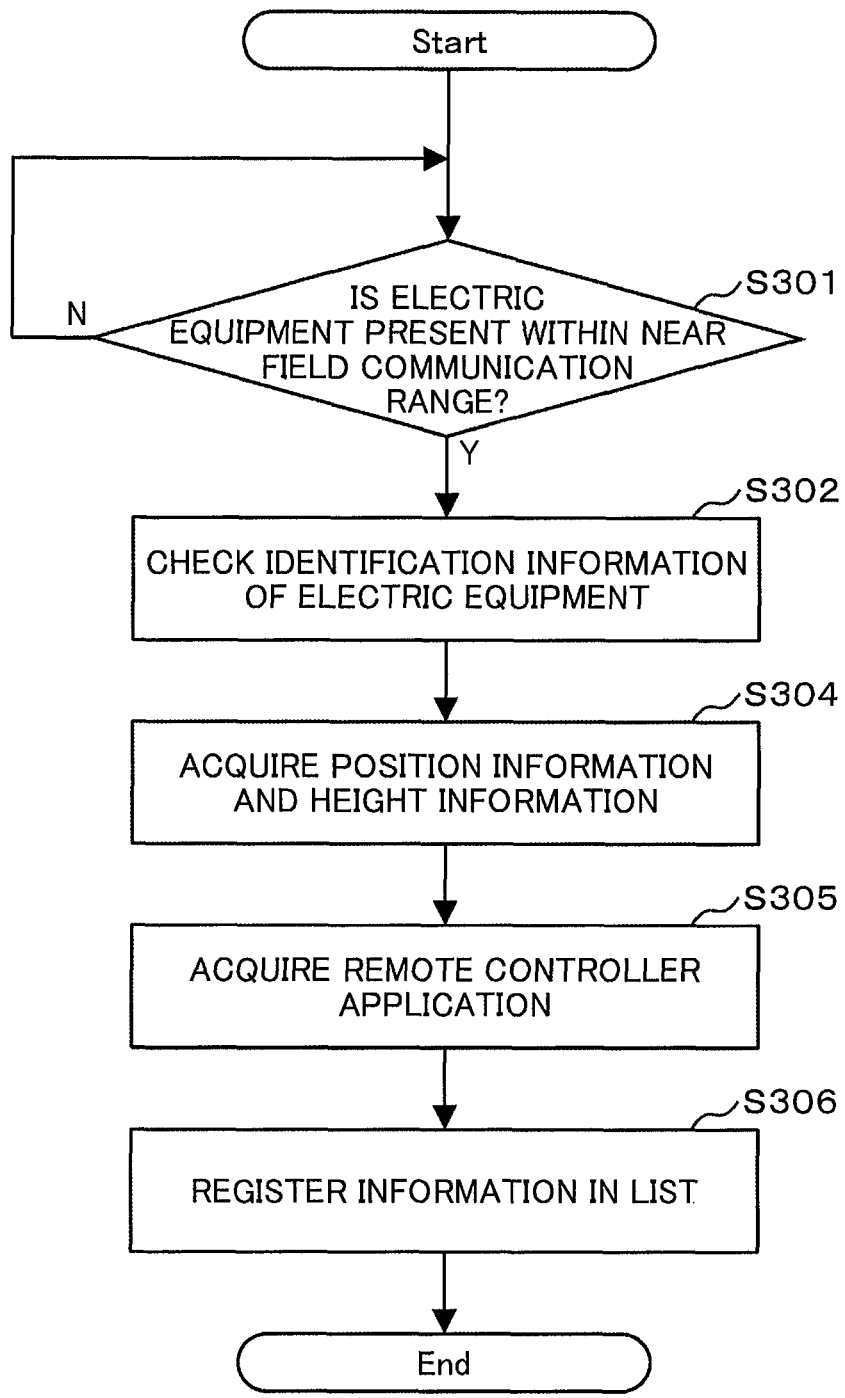
FIG. 4 is a flowchart that illustrates a process of registering an electric equipment according to the first embodiment.

FIG. 4 is a flowchart that illustrates a process of registering an electric equipment 3 that is executed by the terminal device 1 according to the first embodiment. Before remotely controlling the electric equipment 3, it is necessary to register the electric equipment 3. In this embodiment, application software used for calling a remote controller application will be referred to as a launcher application so as to be discriminated from the remote controller application. In this embodiment, the remote controller application is assumed to be registered and called through the launcher application.

In this embodiment, the user can execute a registration process by only placing the terminal device 1 to approach the electric equipment 3.

In Step S301, the terminal device 1 checks whether or not the electric equipment 3 is present inside a communication zone of the near field communication by using the near field communication unit 2712. In a case where the electric equipment 3 is present inside the communication zone, the launcher application is operated, and various kinds of information necessary for remote control of the electric equipment 3 are acquired, and the electric equipment 3 is registered in the terminal device 1.

First, in Step S302, the identification information of the electric equipment 3 is checked.

Next, in Step S304, the current position information and the height information of the terminal device 1 are respectively acquired by the position information acquiring unit 2703 and the height information acquiring unit 2709. At this time, since the electric equipment 3 is located at the same position as that of the terminal device 1, the position information and the height information that have been acquired are the position information and the height information of the electric equipment 3.

Next, in Step S305, the terminal device 1 acquires the remote controller application of the electric equipment 3. Instead of directly acquiring the remote controller application from the electric equipment 3, the remote controller application may be acquired from the Internet network through the wireless router 4 and the network 5 in accordance with a Uniform Resource Locator (URL) represented by the electric equipment 3. Furthermore, the product information and the like may be acquired.

Next, in Step S306, the terminal device 1 registers the identification information, the remote controller application, the position information, the height information, the production information, and the like of the electric equipment 3 that have been acquired in the lists included in the storage unit 2702 and ends the process.

In a case where the electric equipment 3 is installed at a high place, it is difficult to place the terminal device 1 to approach the electric equipment 3, and thus, the electric equipment 3 may be registered by placing the terminal device 1 to approach an NFC tag instead of the electric equipment 3. For example, it is considered to attach an NFC tag seal in which various kinds of information are recorded to an instruction manual or a remote controller 2 of the electric equipment 3, and the electric equipment 3 is registered by placing the terminal device 1 to approach the NFC tag right below the electric equipment 3. In the case of the NFC tag, the height information of the electric equipment 3 may be registered by adding 1 m to the height information of the terminal device 1.

In addition, in a case where the electric equipment 3 is present inside the communication zone of the near field communication of the terminal device 1, an operation up to the operating of the remote controller application may be executed by using the near field communication device 212.

Figure 5:
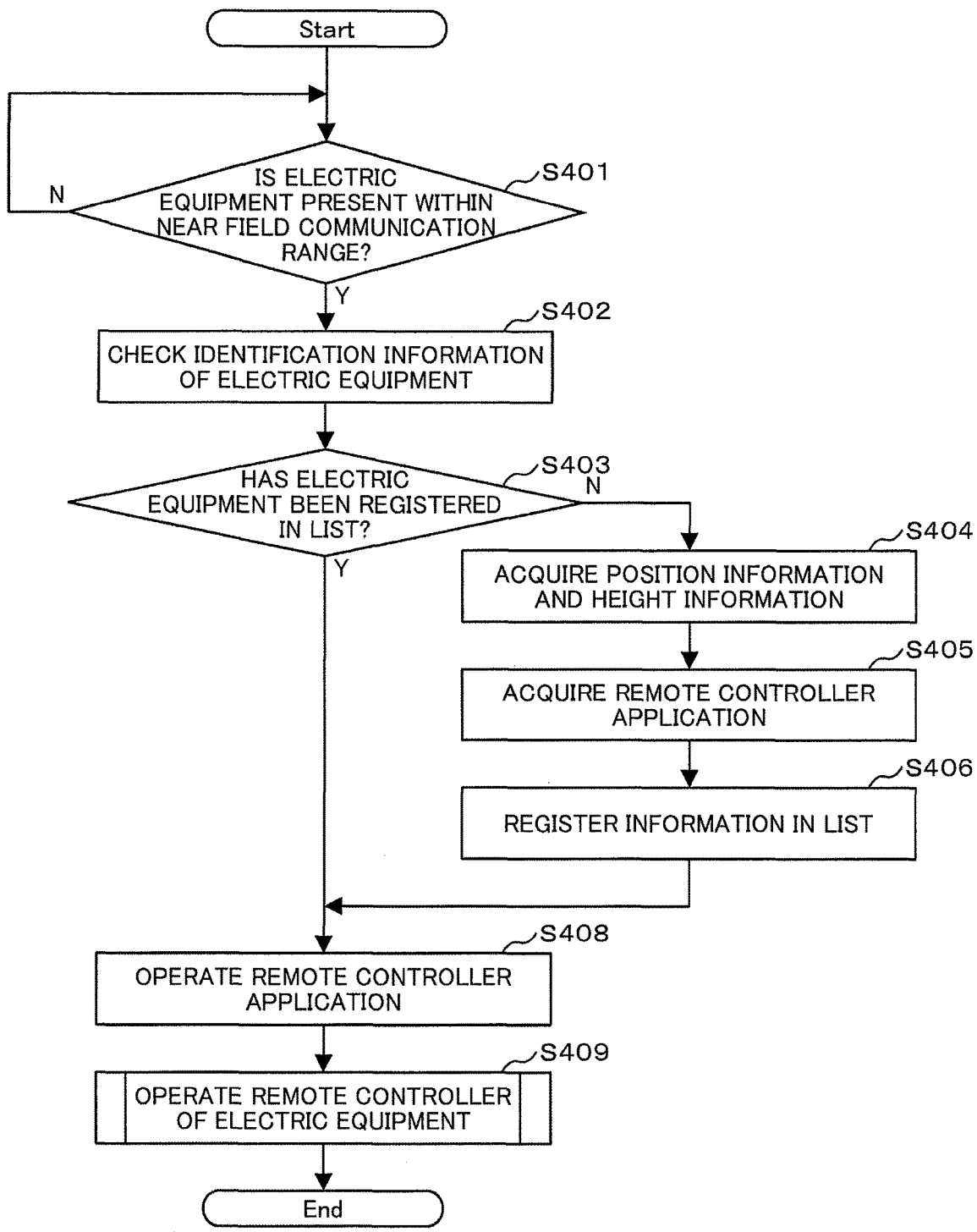
FIG. 5 is a flowchart that illustrates a process of registering an electric equipment according to the first embodiment.

FIG. 5 is a flowchart that illustrates another example of the process of registering an electric equipment 3 executed by the terminal device 1 according to the first embodiment. The process of operating the remote controller application is added to the registration process illustrated in FIG. 4.

Step S401 to Step S402 are processes similar to Step S301 to Step S302 illustrated in FIG. 4, and, in a case where the electric equipment 3 is present inside the communication zone of the near field communication, the identification information of the electric equipment 3 is checked.

In Step S403, the terminal device 1 checks whether or not the electric equipment 3 has been registered in the list stored in the storage unit 2702. In a case where the identification information of the electric equipment 3 is present in the list, the electric equipment 3 has been registered. On the other hand, in a case where the identification information is not present, the electric equipment 3 has not been registered. In a case where the electric equipment 3 has been registered in the list, the process proceeds to Step S408. On the other hand, in a case where the electric equipment 3 has not been registered, the process proceeds to Step S404.

Step S404 to Step S406 are processes similar to Step S304 to Step S306 illustrated in FIG. 4, and the current position information, the height information, and the remote controller application are acquired, and the identification information, the remote controller application, the position information, the height information, the product information, and the like of the electric equipment 3 are registered in the list.

Next, in Step S408, the terminal device 1 operates the remote controller application, and, in Step S409, the user can execute a remote controller operation of the electric equipment 3. When the remote controller operation ends, the process ends.

In addition, in a case where the electric equipment 3 has been registered in the list, it may be checked whether or not the position information and the height information are latest (whether or the position has been moved), and, in a case where the position has been moved, the position information and the height information may be re-registered.

Figure 6:
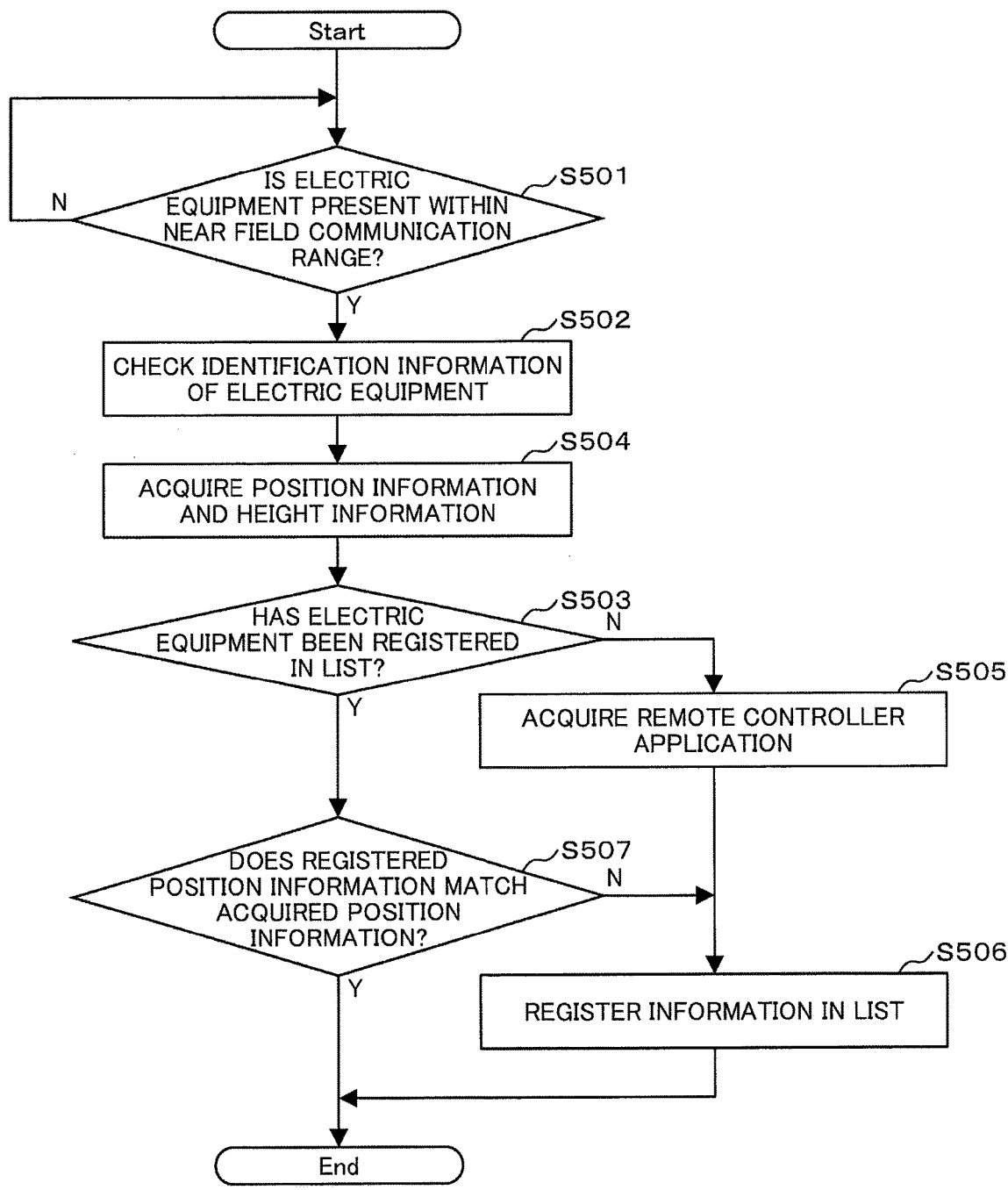
FIG. 6 is a flowchart that illustrates a process of registering an electric equipment according to the first embodiment.

FIG. 6 is a flowchart that illustrates further another example of the process of registering an electric equipment 3 executed by the terminal device 1 according to the first embodiment. A process of checking whether or not the position information and the height information are latest is added to the registration process illustrated in FIG. 4.

Step S501 to Step S504 are processes similar to Step S301 to Step S304 illustrated in FIG. 4. In a case where the electric equipment 3 is present inside the communication zone of the near field communication, the identification information is checked, and the position information and the height information are acquired.

Next, in Step S503, the terminal device 1 checks whether or not the electric equipment 3 has been registered in the list stored in the storage unit 2702. In a case where the electric equipment 3 has been registered in the list, the process proceeds to Step S507. On the other hand, in a case where the electric equipment 3 has not been registered, the process proceeds to Step S505.

Step S505 to Step S506 are processes similar to Step S305 to Step S306 illustrated in FIG. 4, and the remote controller application of the electric equipment 3 is acquired, and the identification information, the remote controller application, the position information, the height information, the product information, and the like of the electric equipment 3 are registered in the list.

In Step S507, the terminal device 1 checks whether or not the position information and the height information of the electric equipment 3 that have been registered coincide with the position information and the height information acquired in Step S504. In a case where the information does not coincide with each other, the process proceeds to Step S506, and the latest position information and the latest height information acquired in Step S504 are registered again in the list.

Figure 7:
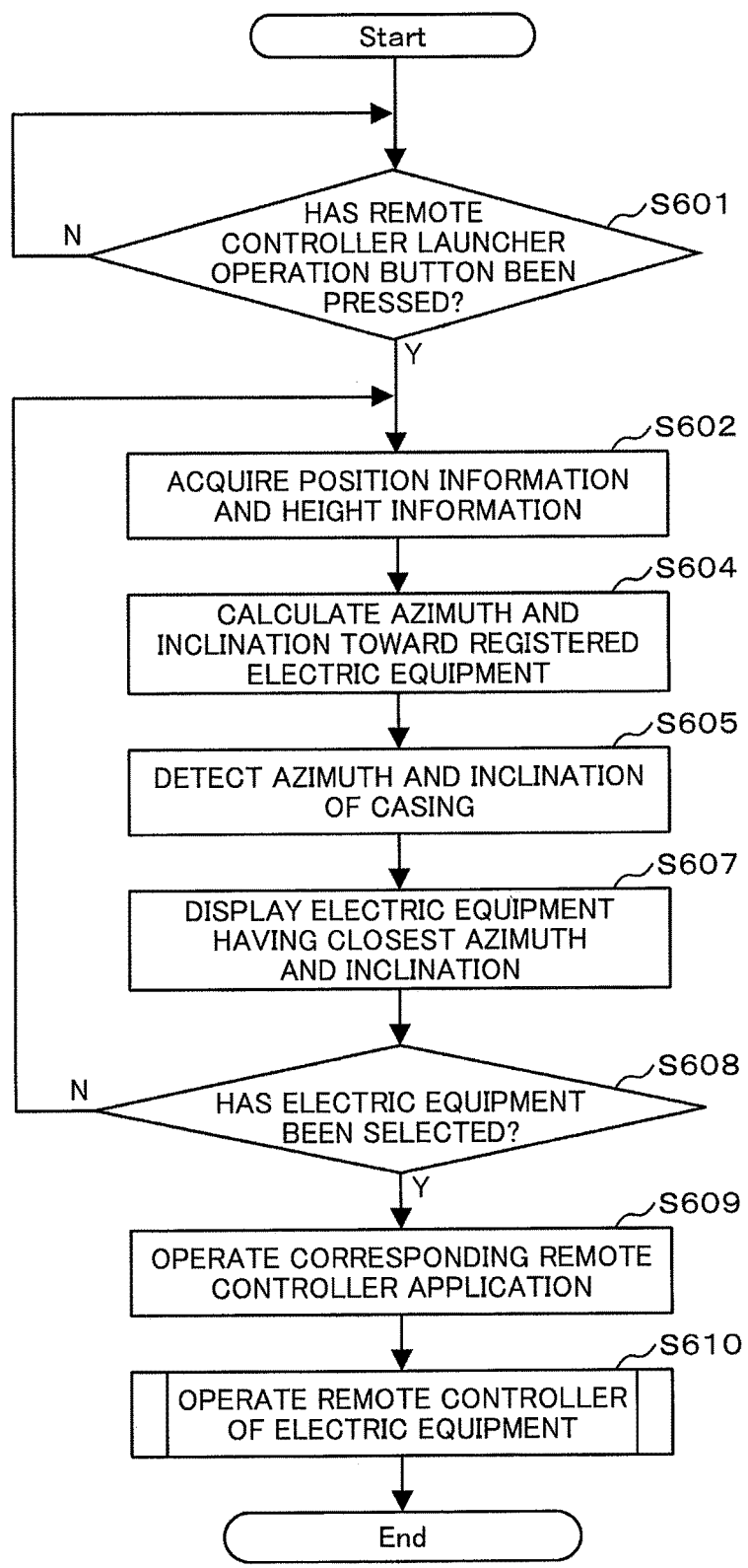
FIG. 7 is a flowchart that illustrates a process of selecting an electric equipment according to the first embodiment.

FIG. 7 is a flowchart that illustrates a process of selecting an electric equipment 3 executed by the terminal device 1 according to the first embodiment. This flowchart illustrates a process of selecting a desired remote controller application by using the launcher application.

In Step S601, the terminal device 1 waits for a remote controller launcher operation button being pressed by the user. As the remote controller launcher operation button, for example, a physical switch such as a home button of the terminal device 1 may be assigned or an icon arranged on the touch panel may be assigned.

Figure 8A:
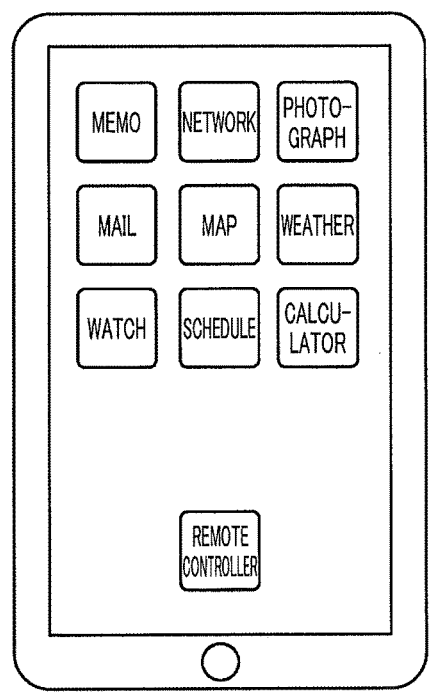
FIG. 8A is an example of display of a touch panel of the terminal device according to the first embodiment.
Figure 8B:
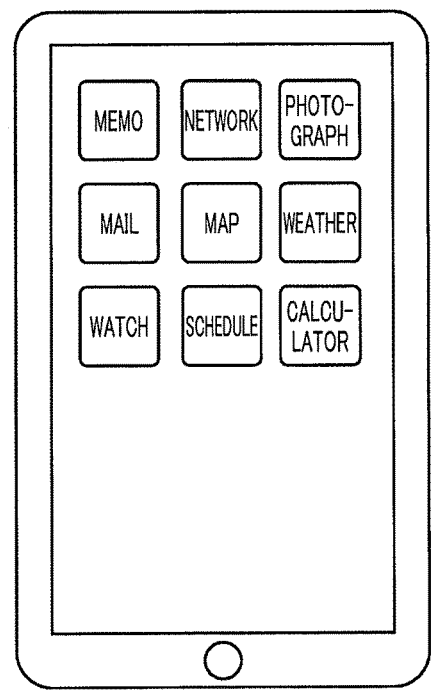
FIG. 8B is an example of display of a touch panel of the terminal device according to the first embodiment.

FIGS. 8A and 8B are examples of display of the touch panel of the terminal device 1. FIG. 8A is an example of a home screen of the terminal device 1, and a "remote controller" launcher icon is displayed among icons of various applications displayed on the touch panel. Here, user's touching this icon is equivalent to pressing the remote controller launcher operation button. The terminal device 1 may be configured to display the "remote controller" launcher icon as illustrated in FIG. 8A only inside the own house and not to display the "remote controller" launcher icon outside the own house as illustrated in FIG. 8B. In such a case, the launcher application of the remote controller is not operated by user's erroneous touch on the "remote controller" launcher icon outside the own house. Alternatively, it may be configured such that the "remote controller" launcher icon is displayed as illustrated in FIG. 8A also outside the own house, and the electric equipment 3 is remotely controlled from the outside of the own house. Whether the terminal device 1 is located inside the own house or outside the own house, for example, may be acquired by checking whether or not the terminal device 1 is present inside the communication zone of the wireless router 4. Alternatively, it can be checked using a GPS or the like.

When the remote controller launcher operation button is pressed, the control unit 2701 operates the launcher application and selects and operates a remote controller application.

First, the process proceeds to Step S602, and the control unit 2701 acquires the position information and the height information of the terminal device 1 by using the position information acquiring unit 2703 and the height information acquiring unit 2709. The position information and the height information that have been acquired represent the current position and the current height of the terminal device 1 at timing when the remote controller operation button is pressed.

Next, in Step S604, the azimuths and the inclinations toward all the electric equipments 3 registered from the terminal device 1 are calculated. The azimuth and the inclination from the terminal device 1 toward each electric equipment 3 are acquired based on the position information and the height information of the electric equipment 3 registered in the position information list 2731 and the height information list 2735 and the current position information and the current height information of the terminal device 1 acquired by the position information acquiring unit 2703 and the height information acquiring unit 2709.

For example, it is assumed that a video monitor 3c1 is installed at latitude of 35.6586580 and longitude of 139.745433, and an air conditioner 3b1 is installed at latitude of 35.6586580 and longitude of 139.745423. When the terminal device 1 is located at the latitude of 35.6586570 and the longitude of 139.745433, the latitudes of the video monitor 3c1 and the air conditioner 3b1 are the same, and the longitudes of the terminal device 1 and the video monitor 3c1 are the same. Accordingly, the azimuth from the terminal device 1 toward the video monitor 3c1 is the north (azimuth angle 0°), and the azimuth from the terminal device 1 toward the air conditioner 3b1 is the north west (azimuth angle 315°). In addition, a distance between the terminal device 1 and the video monitor 3c1 is about 1 m, a distance between the video monitor 3c1 and the air conditioner 3b1 is about 1 m, and a distance between the terminal device 1 and the air conditioner 3b1 is about 1.4 m.

For example, in a case where the terminal device 1 is maintained at a height at which the video monitor 3c1 is installed, and the air conditioner 3b1 is installed further upward by 2.5 m from there, an inclination from the terminal device 1 toward the video monitor 3c1 is horizontal (elevation angle 0°), and an inclination from the terminal device 1 toward the air conditioner 3b1 is diagonally upward (elevation angle 60°).

Next, in Step S605, the azimuth and the inclination of the casing of the terminal device 1 are detected by using the casing azimuth detecting unit 2705 and the casing inclination detecting unit 2710. At this time, the terminal device 1 is placed toward the electric equipment 3 that is desired to be remotely controlled.

Figure 9A:
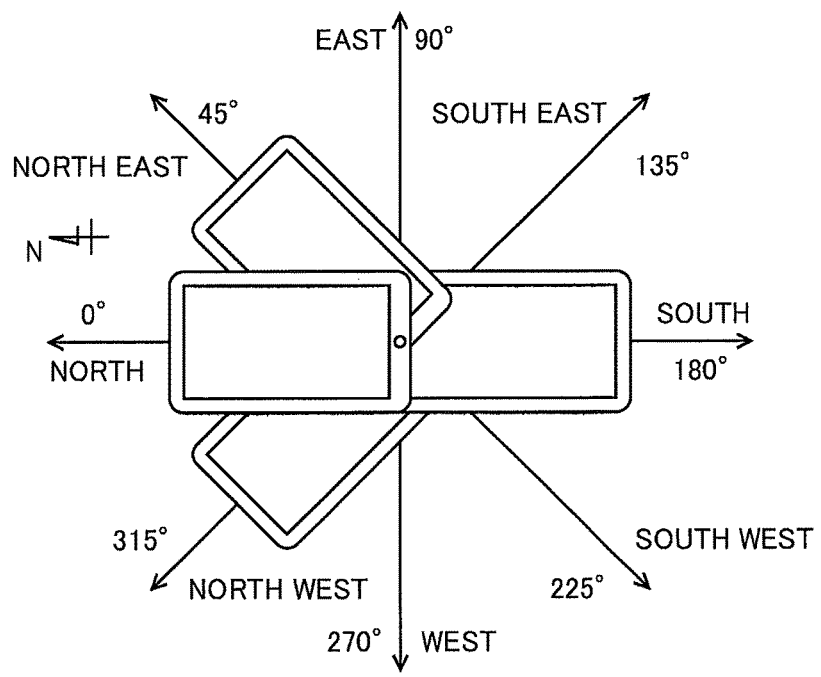
FIG. 9A is a diagram that illustrates the azimuth and the inclination of a casing of the terminal device according to the first embodiment.
Figure 9B:
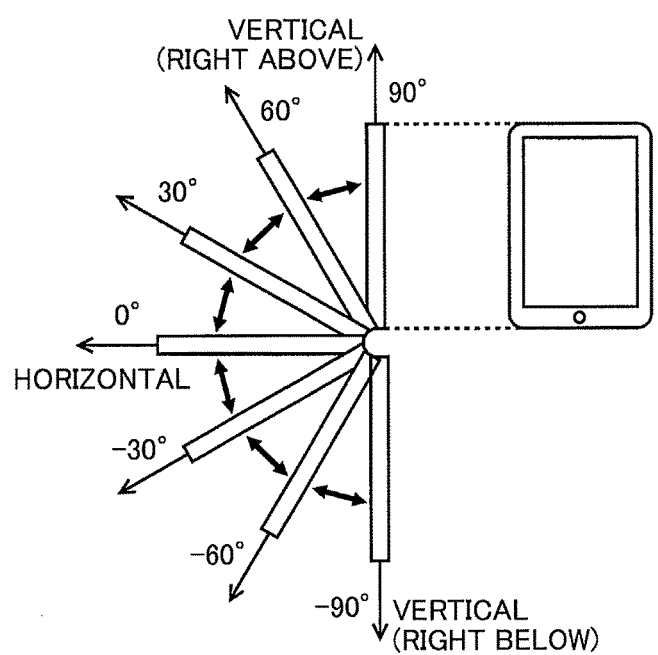
FIG. 9B is a diagram that illustrates the azimuth and the inclination of a casing of the terminal device according to the first embodiment.

FIGS. 9A and 9B are diagrams that illustrate the azimuth, the azimuth angle, the inclination, and the elevation angle of the casing of the terminal device 1. FIG. 9A is a conceptual diagram that illustrates the azimuth of the casing and the azimuth angle of the terminal device 1. As the relation between the azimuth and the azimuth angle, when the north is set as 0°, the north east is 45°, the east is 90°, the south east is 135°, the south is 180°, the south west is 225°, the west is 270°, and the north west is 315°.

Then, in Step S607, the control unit 2701 displays the icon of an electric equipment 3 of which the azimuth and the inclination that have been calculated in Step S604 are closest to the azimuth and the inclination of the casing of the terminal device 1 on the user interface unit 2708. Alternatively, an icon may be displayed not only when the azimuths and the inclinations are closest to each other but also when a difference between the azimuths is within a predetermined range (for example, an azimuth angle of ±10°) or when a difference between the inclinations is within a predetermined range (for example, an elevation angle of ±10°). Alternatively, several electric equipments 3 of close azimuths and inclinations may be displayed.

For example, in a case where the electric equipment 3 is present at the end of an arrow of 45° illustrated in FIG. 9A, the azimuth from the terminal device 1 toward the electric equipment 3 is the north east (azimuth angle 45°), and the azimuth (azimuth angle) toward the electric equipment 3 coincides with the azimuth of the casing of the terminal device 1 when the azimuth of the casing of the terminal device 1 is near the north east (azimuth angle 45°).

FIG. 9B is a conceptual diagram that illustrates the inclination and the elevation angle of the casing of the terminal device 1. As the inclination (elevation angle), when the horizontal side is 0°, the vertical side (right above) is 90°, and the vertical side (right below) is −90°. For example, in a case where the electric equipment 3 is present at the end of an arrow of diagonally upward 30° illustrated in FIG. 9B, the inclination (elevation angle) from the terminal device 1 toward the electric equipment 3 is 30°, and, when the inclination (elevation angle) of the casing of the terminal device 1 is about 30°, the inclination (elevation angle) toward the electric equipment 3 and the inclination of the casing coincide with each other.

For example, when the azimuth (azimuth angle) from the terminal device 1 toward the electric equipment 3 is denoted by a, the inclination (elevation angle) from the terminal device 1 toward the electric equipment 3 is denoted by c, the azimuth (azimuth angle) of the casing of the terminal device 1 is denoted by b, and the inclination (elevation angle) of the casing is denoted by d, $X=(a-b)^2+(c-d)^2$ is calculated. Then, by acquiring an electric equipment 3 having a smallest X, an electric equipment 3 having an azimuth and an inclination closest to those of the casing of the terminal device 1 can be specified. At this time, by weighting a difference between the azimuths or a difference between the inclinations, one of the azimuth and the inclination may be prioritized.

FIGS. 10A to 10D are examples of display of the touch panel of the terminal device 1.

Figure 10A:
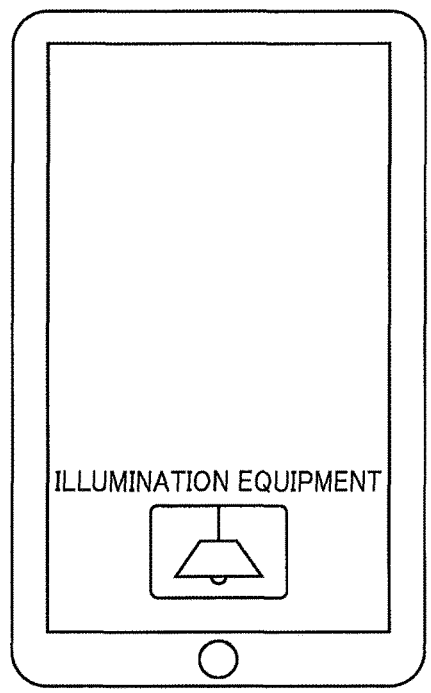
FIG. 10A is an example of display of a touch panel of the terminal device according to the first embodiment.

FIG. 10A is an example of display of the touch panel of a case where the terminal device 1 is placed toward an illumination equipment 3a1. An icon of the illumination equipment is displayed on the touch panel, and it represents that the illumination equipment 3a1 is present in the direction of an azimuth and an inclination toward which the terminal device 1 is placed.

Figure 10B:
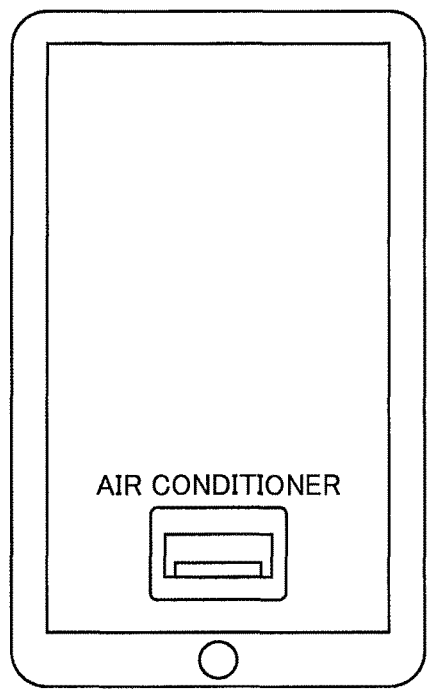
FIG. 10B is an example of display of the touch panel of the terminal device according to the first embodiment.
Figure 10C:
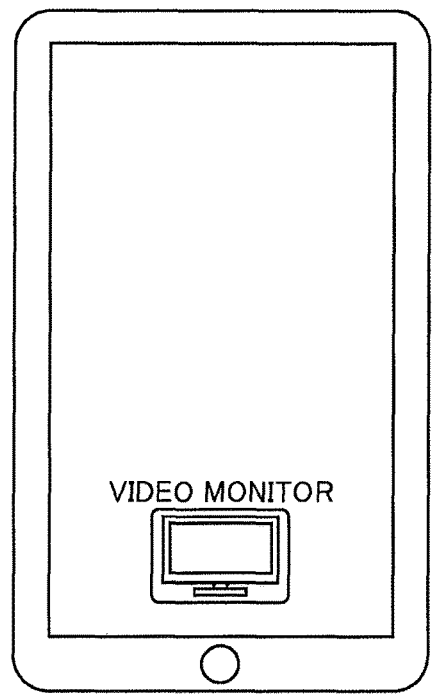
FIG. 10C is an example of display of the touch panel of the terminal device according to the first embodiment.

FIG. 10B is an example of display of the touch panel of a case where the terminal device 1 is placed toward an air conditioner 3b1. An icon of the air conditioner is displayed on the touch panel, and it represents that the air conditioner 3b1 is present in the direction of an azimuth and an inclination toward which the terminal device 1 is placed.

FIG. 100 is an example of display of the touch panel of a case where the terminal device 1 is placed toward a video monitor 3c1. An icon of the video monitor is displayed on the touch panel, and it represents that the video monitor 3c1 is present in the direction of an azimuth and an inclination toward which the terminal device 1 is placed.

Figure 10D:
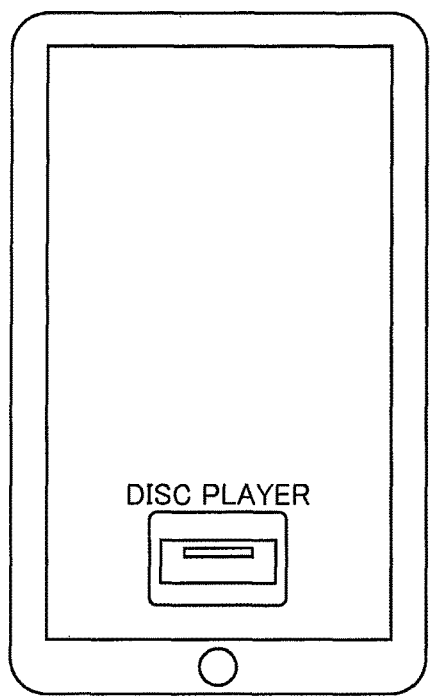
FIG. 10D is an example of display of the touch panel of the terminal device according to the first embodiment.

FIG. 10D is an example of display of the touch panel of a case where the terminal device 1 is placed toward a disc player 3d1. An icon of the disc player is displayed on the touch panel, and it represents that the disc player 3d1 is present in the direction of an azimuth and an inclination toward which the terminal device 1 is placed.

In addition, on the left/right/upper/lower side of the icon, the icon of an electric equipment 3 of which the azimuth and the inclination are second closest to those of the terminal device may be further displayed. In such a case, the icon of a desired electric equipment 3 can be easily found. Alternatively, only the icon of an electric equipment 3 that is not only closest to the terminal device but has difference in the azimuth being within a predetermined range (for example, an azimuth angle of ±45°) or having a difference in the inclination being within a predetermined range (for example, an elevation angle of ±45°) may be displayed on the upper/lower/left/right side. Alternatively, several electric equipments 3 having close azimuths and inclinations may be displayed. In such a case, the icon of a desired electric equipment 3 can be easily found by excluding icons of electric equipments 3 disposed in completely different directions.

By touching such an icon, the remote controller application of the desired electric equipment 3 can be operated, and the desired electric equipment 3 can be remotely controlled.

FIGS. 11A to 13B illustrate examples of the room arrangement and the arrangement of the terminal device 1 and the electric equipments 3. FIGS. 11A, 12A, and 13A are diagrams acquired by viewing the room from the top, and FIGS. 11B, 12B, and 13B are diagrams acquired by viewing the room from the side. In the room, the illumination equipment 3a1, the air conditioner 3b1, the video monitor 3c1, and the disc player 3d1 are installed. A user selects and remotely controls the electric equipment 3 by using the terminal device 1.

In the examples illustrated in FIGS. 11A to 13B, while the room arrangements and the arrangements of the electric equipments 3 are the same, the positions (the latitudes and the longitudes) and the heights of the terminal devices 1 are different. FIGS. 11A and 11B are examples in which the terminal device 1 is located in front of the video monitor 3c1, and FIGS. 12A and 12B are examples in which the terminal device 1 is located in front of the disc player 3d1. Between the case illustrated in FIGS. 11A and 11B and the case illustrated in FIGS. 12A and 12B, while the positions (the latitudes and the longitudes) of the terminal device 1 are the same, the heights thereof are different from each other. Between the case illustrated in FIGS. 11A and 11B and the case illustrated in FIGS. 13A and 13B, while the heights of the terminal device 1 are the same, the positions (the latitudes and the longitudes) thereof are different from each other.

In the case illustrated in FIGS. 11A and 11B, from the terminal device 1, the azimuth and the inclination (elevation angle) toward the illumination equipment 3a1 are the south (an azimuth angle of 180°) and 60°, the azimuth and the inclination (elevation angle) toward the air conditioner 3b1 are the north west (an azimuth angle of 315°) and 60°, the azimuth and the inclination (elevation angle) toward the video monitor 3c1 are the north (an azimuth angle of 0°) and 0°, and the azimuth and the inclination (elevation angle) toward the disc player 3d1 are the north (an azimuth angle of 0°) and −30°.

When the terminal device 1 is operated at this position, for example, in a case where the azimuth of the casing of the terminal device 1 is near the south (an azimuth angle of 180°), and the inclination (elevation angle) of the casing is about 60°, the illumination equipment 3a1 can be selected, and, in a case where the azimuth of the casing of the terminal device 1 is near the northwest (an azimuth angle of 315°), and the inclination (elevation angle) of the casing is near 60°, the air conditioner 3b1 can be selected. In addition, in a case where the azimuth of the casing of the terminal device 1 is near the north (an azimuth angle of 0°), and the inclination (elevation angle) of the casing is about 0°, the video monitor 3c1 can be selected, and, in a case where the inclination (elevation angle) of the casing is near −30°, the disc player 3d1 can be selected.

In the case illustrated in FIGS. 12A and 12B, similar to the case illustrated in FIGS. 11A and 11B, from the terminal device 1, the azimuth and the inclination (elevation angle) toward the illumination equipment 3a1 are the south (an azimuth angle of 180°) and 70°, the azimuth and the inclination (elevation angle) toward the air conditioner 3b1 are the north west (an azimuth angle of 315°) and 70°, the azimuth and the inclination (elevation angle) toward the video monitor 3c1 are the north (an azimuth angle of 0°) and 30°, and the azimuth and the inclination (elevation angle) toward the disc player 3d1 are the north (an azimuth angle of 0°) and 0°.

When the terminal device 1 is operated at this position, for example, in a case where the azimuth of the casing of the terminal device 1 is near the south (an azimuth angle of 180°), and the inclination (elevation angle) of the casing is about 70°, the illumination equipment 3a1 can be selected, and, in a case where the azimuth of the casing of the terminal device 1 is near the northwest (an azimuth angle of 315°), and the inclination (elevation angle) of the casing is near 70°, the air conditioner 3b1 can be selected. In addition, in a case where the azimuth of the casing of the terminal device 1 is near the north (an azimuth angle of 0°), and the inclination (elevation angle) of the casing is about 30°, the video monitor 3c1 can be selected, and, in a case where the inclination (elevation angle) of the casing is near 0°, the disc player 3d1 can be selected.

In the case illustrated in FIGS. 13A and 13B, from the terminal device 1, the azimuth and the inclination (elevation angle) toward the illumination equipment 3a1 are the east south east (an azimuth angle of 120°) and 60°, the azimuth and the inclination (elevation angle) toward the air conditioner 3b1 are the north (an azimuth angle of 0°) and 60°, the azimuth and the inclination (elevation angle) toward the video monitor 3c1 are the north east (an azimuth angle of 45°) and 0°, and the azimuth and the inclination (elevation angle) toward the disc player 3d1 are the north east (an azimuth angle of 45°) and −30°.

When the terminal device 1 is operated at this position, for example, in a case where the azimuth of the casing of the terminal device 1 is near the east south east (an azimuth angle of 120°), and the inclination (elevation angle) of the casing is about 60°, the illumination equipment 3a1 can be selected, and, in a case where the azimuth of the casing of the terminal device 1 is near the north (an azimuth angle of) 0°, and the inclination (elevation angle) of the casing is near 60°, the air conditioner 3b1 can be selected. In addition, in a case where the azimuth of the casing of the terminal device 1 is near the north east (an azimuth angle of 45°), and the inclination (elevation angle) of the casing is about 0°, the video monitor 3c1 can be selected, and, in a case where the inclination (elevation angle) of the casing is near −30°, the disc player 3d1 can be selected.

Referring back to FIG. 7, the description of the flowchart will be resumed.

Next, in Step S608, when an electric equipment 3 that is remotely controlled is selected by the user, the process proceeds to Step S609. On the other hand, in a case where no electric equipment is selected, the process is returned to Step S602, and the process is continued.

In Step S609, the terminal device 1 operates a remote controller application corresponding to the selected electric equipment 3. At this time, information of the electric equipment 3 is given to the operated remote controller application as is necessary. For example, for a remote controller application corresponding to a plurality of electric equipments 3, the type of the electric equipment 3 may need to be designated at the time of the operation. In such a case, the information of the type of the electric equipment 3 is given.

Next, in Step S610, the user can execute a remote control operation of the electric equipment 3. When the remote control operation ends, the process ends. The end of the remote control operation, for example, is executed by the user pressing the home button of the terminal device 1.

In this embodiment, while an example is illustrated in which the casing of the terminal device 1 is used to have the posture (direction) in the vertical direction, the casing may be similarly used in the horizontal direction.

Figure 14C:
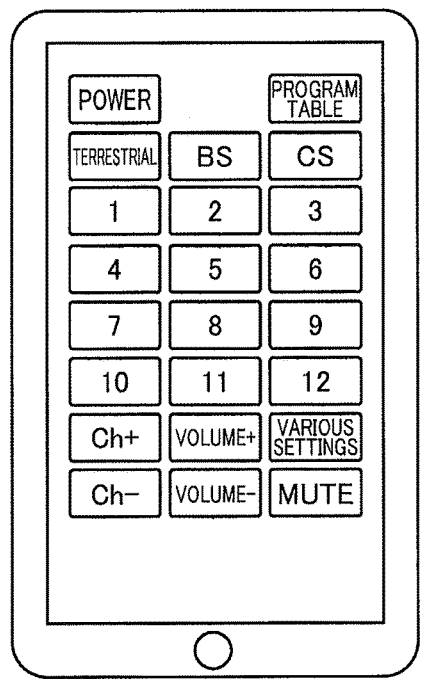
FIG. 14C is an example of display of the touch panel of the terminal device according to the first embodiment.
Figure 14D:
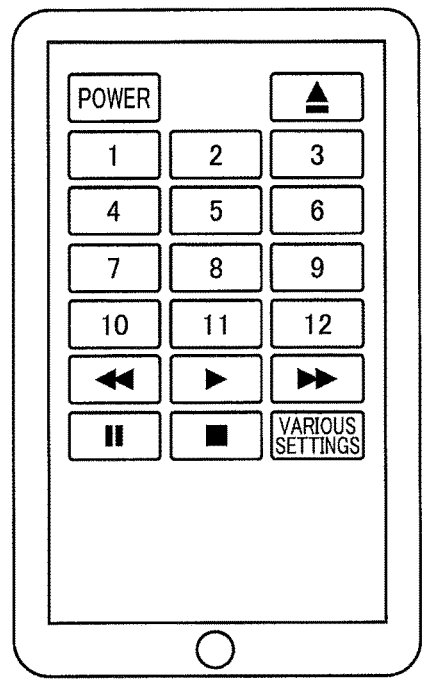
FIG. 14D is an example of display of the touch panel of the terminal device according to the first embodiment.

FIGS. 14A to 14D are examples of display of the touch panel at the time of operating the remote controller application of the selected electric equipment 3. FIG. 14A is an example of display of the touch panel at the time of operating the remote controller application of the illumination equipment 3a, FIG. 14B is an example of display of the touch panel at the time of operating the remote controller application of the air conditioner 3b, FIG. 14C is an example of display of the touch panel at the time of operating the remote controller application of the video monitor 3c, and FIG. 14D is an example of display of the touch panel at the time of operating the remote controller application of the disc player 3d1.

By employing the configuration described above, in the first embodiment, the terminal device 1 acquires information that is necessary for remote controlling the electric equipment 3 from the electric equipment 3 in advance. The acquisition of the information, for example, is executed through near field communication and, at this time, the position information and the height information of the electric equipment 3 are acquired by using the function of the terminal device 1. The terminal device 1 registers such information in the storage unit.

Then, when the remote controller launcher operation button is pressed, the terminal device 1 acquires the position information and the height information of the terminal device and calculates an azimuth and an inclination toward each electric equipment 3 based on the registered position information of the electric equipment 3. In this way, also in a case where the terminal device 1 is moved to a new place, an azimuth and an inclination at the new place toward each electric equipment 3 can be acquired.

In addition, the icon of an electric equipment 3 of which the azimuth and the inclination are closest to the azimuth and the inclination of the casing of the terminal device 1 is displayed on the display of the terminal device 1. As the user places the terminal device 1 toward the electric equipment 3 desired to be remotely controlled, the icon of a desired electric equipment among the plurality of electric equipments 3 can be quickly selected.

When an icon is selected, a corresponding remote controller application is operated, and the desired electric equipment 3 can be remotely controlled.

As described above, the terminal device and the remote control method enabling a user to control electric equipments by executing a simple operation and improving the usability are provided.

[Embodiment 2]

In a second embodiment, a function for selecting an electric equipment 3 to be remotely controlled in consideration of a distance between the terminal device 1 and the electric equipment 3 is added to the first embodiment.

Figure 15:
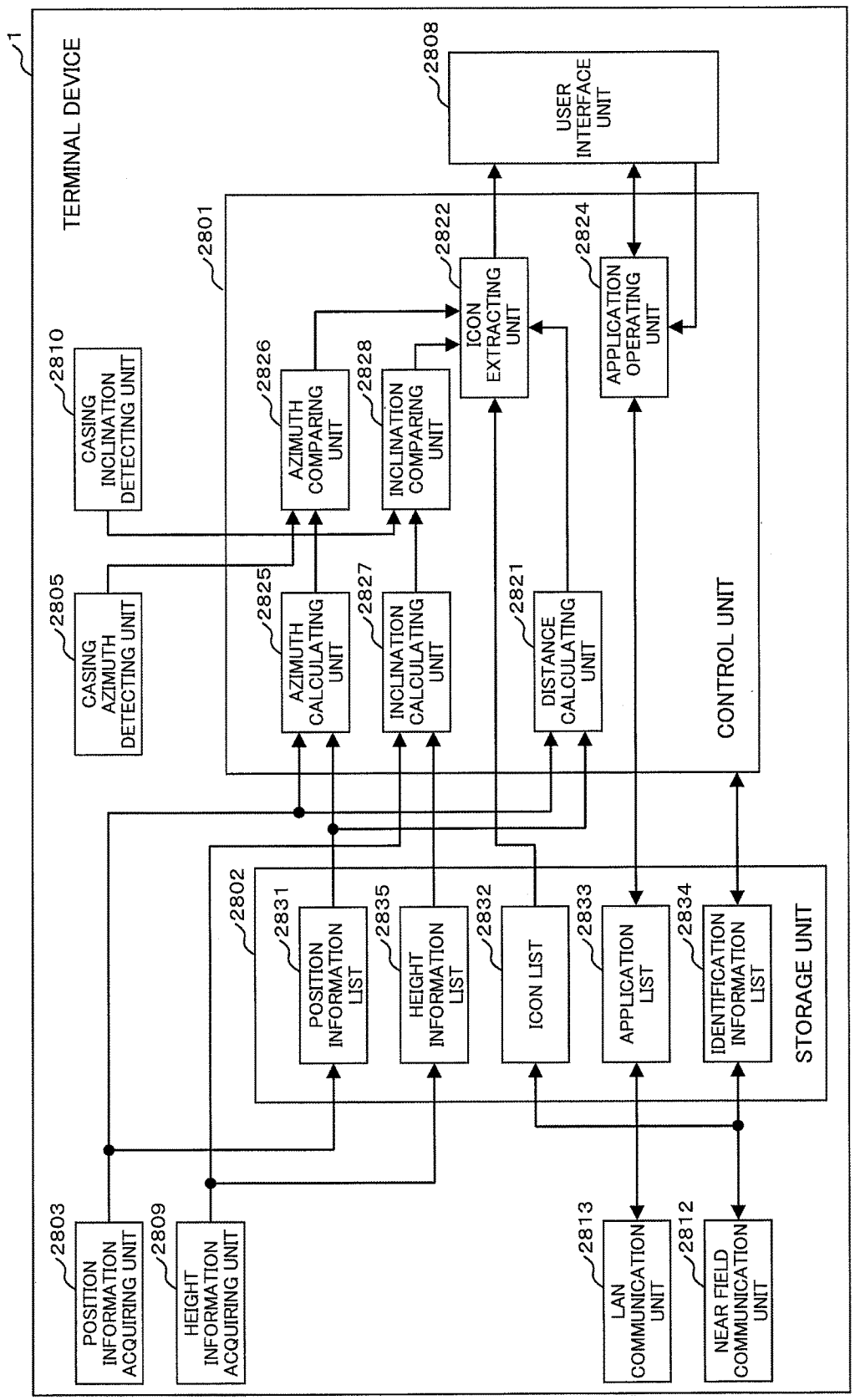
FIG. 15 is a functional block diagram of the terminal device according to a second embodiment.

FIG. 15 is a functional block diagram of the terminal device 1 according to the second embodiment. Each functional block of the terminal device 1, for example, is operated by being controlled by the CPU 201 included in the terminal device 1 illustrated in FIG. 2.

A control unit 2801 has a configuration acquired by adding a distance calculating unit 2821 to the control unit 2701 illustrated in FIG. 3 and executes registration of electric equipments 3 before the use of the remote controller, selection of an electric equipment 3 at the time of using the remote controller, and remote control by controlling a storage unit 2802, a position information acquiring unit 2803, a height information acquiring unit 2809, a casing azimuth detecting unit 2805, a casing inclination detecting unit 2810, a near field communication unit 2812, a LAN communication unit 2813, and the like based on an instruction transmitted from a user interface unit 2808. The user interface unit 2808, similar to the user interface unit 2708 illustrated in FIG. 3, represents various kinds of information to a user and transmits a user's instruction to the control unit 2801.

The position information acquiring unit 2803 and the height information acquiring unit 2809, similar to the position information acquiring unit 2703 and the height information acquiring unit 2709 illustrated in FIG. 3, acquires the position information and the height information. The casing azimuth detecting unit 2805 and the casing inclination detecting unit 2810, similar to the casing azimuth detecting unit 2705 and the casing inclination detecting unit 2710 illustrated in FIG. 3 and detects the azimuth and the inclination of the casing.

A registration process before the use of the remote controller is similar to the registration process illustrated in FIG. 3, and thus, description thereof will not be presented.

When the remote controller is used, the control unit 2801 selects an electric equipment 3 to be remotely controlled among electric equipments 3 registered in the storage unit 2802. First, the position information of the terminal device 1 is acquired by using the position information acquiring unit 2803, and an azimuth (an azimuth angle from the terminal device 1 toward the electric equipment 3) is calculated by comparing the acquired position information with the position information of all the electric equipments 3 included in the position information list 2831 by using the azimuth calculating unit 2825, and a distance (a distance between the terminal device 1 and the electric equipment 3) is calculated by comparing the acquired position information is with the position information of all the electric equipments 3 included in the position information list 2831 by using the distance calculating unit 2821. Simultaneously, height information is acquired by using the height information acquiring unit 2809, and an inclination (an elevation angle from the terminal device 1 toward the electric equipment 3) is calculated by comparing the acquired height information with the position information of all the electric equipments 3 included in the height information list 2835 by using the inclination calculating unit 2827.

Next, the azimuth of the casing of the terminal device 1 is detected by using the casing azimuth detecting unit 2805, and the detected azimuth is compared with each azimuth from the terminal device 1 toward each electric equipment 3 by using the azimuth comparing unit 2826. Simultaneously, the inclination of the casing of the terminal device 1 is detected by using the casing inclination detecting unit 2810, and the detected inclination is compared with each inclination from the terminal device 1 toward each electric equipment 3 by using the inclination comparing unit 2828. Next, based on a result of the comparison described above and the distance described above, an icon of the electric equipment 3 that is located in the direction of an azimuth and an inclination that are closest to the azimuth and the inclination of the casing and is within a predetermined distance is extracted from the icon list 2832 by using the icon extracting unit 2822, and the extracted icon is displayed on the user interface unit 2808.

Then, in a case where the icon displayed on the user interface unit 2808 is the icon of a desired electric equipment 3, the user selects the icon, and the user can remotely control the desired electric equipment 3 by using the terminal device 1.

Figure 16:
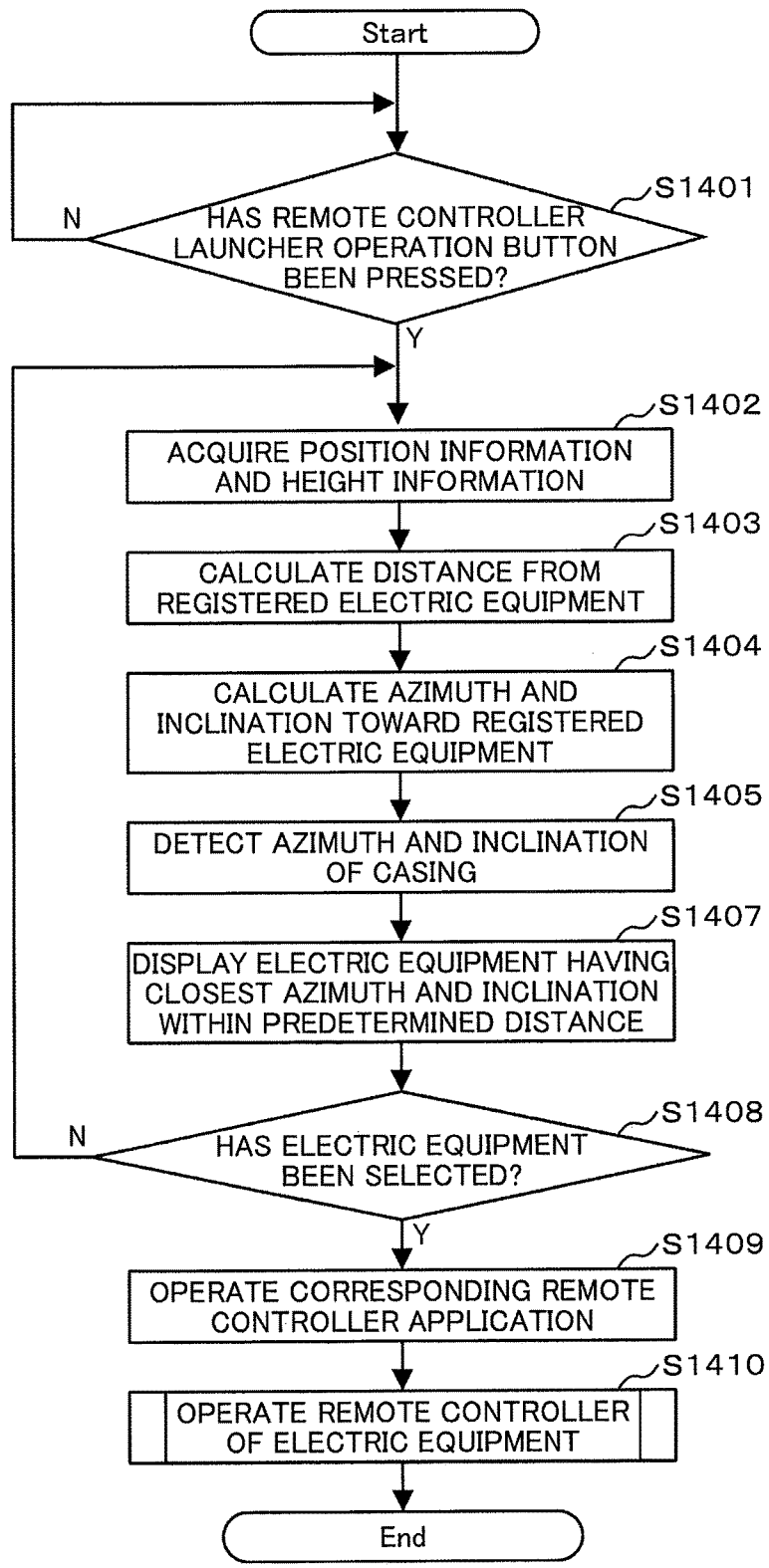
FIG. 16 is a flowchart that illustrates a process of selecting an electric equipment according to the second embodiment.

FIG. 16 is a flowchart that illustrates a process of selecting an electric equipment 3 executed by the terminal device 1 according to the second embodiment. This flowchart illustrates the process of selecting a desired remote controller application by using a launcher application.

Step S1401 to Step S1402 are processes similar to Step S601 to Step S602 illustrated in FIG. 7, and, when a remote controller launcher operation button is pressed, the control unit 2801 acquires the position information and the height information of the terminal device 1.

Next, in Step S1403, the distance calculating unit 2821 calculates a distance between the terminal device 1 and the electric equipment 3. The distance between the terminal device 1 and the electric equipment 3 is acquired based on the registered position information of the electric equipment 3 and the current position information of the terminal device 1.

Step S1404 to Step S1405 are processes similar to Step S604 to Step S605 illustrated in FIG. 7, and the azimuth calculating unit 2826 and the inclination calculating unit 2827 calculate an azimuth and an inclination from the terminal device 1 toward the electric equipment 3, and the casing azimuth detecting unit 1805 and the casing inclination detecting unit 2810 detect the azimuth and the inclination of the casing of the terminal device 1.

Then, in Step S1407, the icon of an electric equipment 3 which is within a predetermined distance A set in advance and of which the azimuth and the inclination that have been calculated in Step S1404 are closest to the azimuth and the inclination of the casing of the terminal device 1 detected in Step S1405 is displayed on the user interface unit 2808. Alternatively, several electric equipments 3 of close azimuths and inclinations may be displayed.

Examples of display of the touch panel of the terminal device 1 are similar to those illustrated in FIGS. 10A to 10D. By user's touching such an icon, the remote controller application of the desired electric equipment 3 can be operated, and the desired electric equipment 3 can be remotely controlled.

FIG. 17 is a diagram that illustrates the arrangement of a room and the arrangement of the terminal device 1 and electric equipments 3. In the room in which the terminal device 1 is present, an illumination equipment 3$a$1, an air conditioner 3$b$1, a video monitor 3$c$1, and a disc player 3$d$1 are installed, and the electric equipments 3 are located within a predetermined distance A. A user selects one of such electric equipments 3 and executes a remote control operation of the electric equipment by using the terminal device 1.

In another room, while an illumination equipment 3$a$2 and an air conditioner 3$b$2 are installed, such electric equipments 3 are located outside the predetermined distance A, and such an electric equipment 3 cannot be selected by using the terminal device 1.

Step S1408 to Step S1410 are processes similar to Step S608 to Step S610 illustrated in FIG. 7. In Step S1408, when the user selects an electric equipment 3, the control unit 2801 operates a corresponding remote controller application in Step S1409, and the user can execute a remote control operation of the electric equipment 3 in Step S1410.

In Step S1407, for example, in a case where the predetermined distance A is determined in consideration of the size of the room in which the electric equipments 3 are installed, only the electric equipments 3 disposed inside the room can be displayed on the user interface unit 2808. The predetermined distance may be changed based on the position information, and, for example, also in a case where there are a plurality of rooms, and the sizes of the rooms are different from each other, only the electric equipments 3 disposed in each room can be displayed. In addition, the predetermined distance A may be automatically determined, by estimating the size of the room, for example, based on a registered distance up to a closest air conditioner 3$b$1 when the remote controller operation button is pressed. Furthermore, room information installed at the time of registering the electric equipment 3 may be also registered, and only the electric equipments 3 arranged in the room in which the terminal device 1 is present may be displayed. In addition, the predetermined distance A may be determined in accordance with the arrival distance of infrared light or the like of the remote controller 2 that is dedicatedly used for the electric equipment 3.

By employing the configuration described above, in the second embodiment, the same effects as those of the first embodiment can be acquired.

The terminal device 1 displays only the icons of the electric equipments 3 disposed within the predetermined distance set in advance on the display. Since there is no display of any icon of an electric equipment 3 disposed at a far place such as another room or the like during the selection of the icon of the electric equipment 3, the icon of the desired electric equipment 3 can be quickly selected from among the plurality of electric equipments 3.

[Embodiment 3]

In a third embodiment, a function for switching between methods of calculating the azimuth and the inclination of an electric equipment 3 based on whether or not the terminal device 1 is located within a predetermined range is added to the first embodiment.

Figure 18:
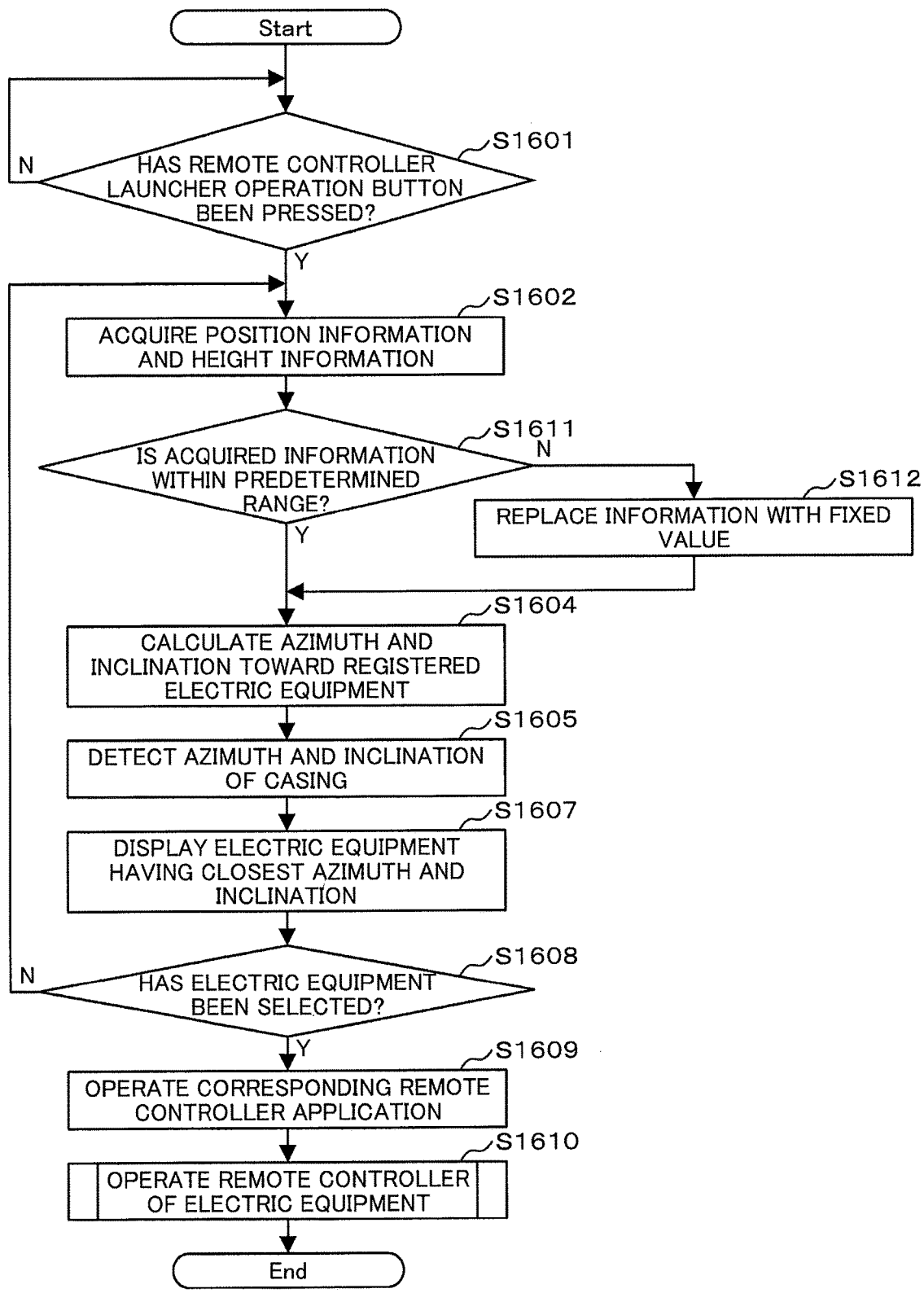
FIG. 18 is a flowchart that illustrates a process of selecting an electric equipment according to a third embodiment.

FIG. 18 is a flowchart that illustrates a process of selecting an electric equipment 3 executed by the terminal device 1 according to the third embodiment. This flowchart illustrates the process of selecting a desired remote controller application by using a launcher application.

Step S1601 to Step S1602 are processes similar to Step S601 to Step S602 illustrated in FIG. 7, and, when a remote controller launcher operation button is pressed, the control unit 2801 acquires the position information and the height information of the terminal device 1.

Next, in Step S1611, switching between processes is executed based on whether or not the acquired information is within the predetermined range. In a case where the acquired information is within the predetermined range, the process proceeds to Step S1604. On the other hand, in a case where the acquired information is not within the predetermined range, in Step S1612, after the acquired information is replaced with a fixed value in advance, the process proceeds to Step S1604.

For example, the predetermined range of the height information is set as up to 1 m from the floor, and the fixed value is set as 0.5 m from the floor. In a case where the acquired height information is 2 m from the floor, the height information is replaced with the fixed value 0.5 m. Alternatively, for example, the fixed value may be the same value as that of a specific electric equipment such as the video monitor $3c1$. For example, in a case where the height information of the terminal device 1 is acquired by using the atmospheric pressure sensor 214, there are cases where an error occurs due to a change in the surrounding environments including the weather. It is difficult to consider a case where the height of the terminal device 1 is 2 m from the floor, and thus, in a case where such height information is acquired, the height information is replaced with a fixed value, for example, 0.5 m that is general, whereby an erroneous operation of the remote controller is reduced.

For example, the predetermined range of the position information is set as the inside of a determined room, and the fixed value is associated with the center position of the room. In a case where the acquired position information is outside the room, the position information is replaced with the center position of the room.

Step S1604 to Step S1607 are processes similar to Step S604 to Step S607 illustrated in FIG. 7, and an azimuth and an inclination from the terminal device 1 toward the electric equipment 3 are calculated, and the icon of an electric equipment 3 of which the azimuth and the inclination are closest to those of the casing of the terminal device 1 is displayed.

Examples of display of the touch panel of the terminal device 1 are as illustrated in FIGS. 10A to 10D.

By touching such an icon, the user can operate the remote controller application of the desired electric equipment 3 and can remotely control the desired electric equipment 3.

By employing the configuration described above, in the third embodiment, the same effects as those of the first embodiment can be acquired.

In a case where the acquired information is not within the predetermined range, the acquired information is replaced with the fixed value set in advance, and an azimuth and an inclination are calculated. Accordingly, for example, also in a case where the accuracy of the position information and the height information is low, the icon of a desired electric equipment can be quickly selected from among the plurality of electric equipments.

In addition, for example, also in a case where the user goes out, as if the user is present at the center of the room, the icon of a desired electric equipment can be quickly selected from among the plurality of electric equipments.

[Embodiment 4]

In a fourth embodiment, a function for switching between operations based on whether or not the terminal device 1 is located near a registered electric equipment 3 is added to the first embodiment.

FIG. 19 is a flowchart that illustrates a process of selecting an electric equipment 3 executed by the terminal device 1 according to the fourth embodiment. This flowchart illustrates the process of selecting a desired remote controller application using a launcher application by operating an all-time launcher application on a home screen of the terminal device 1.

In Step S1711 and Step S1712, the terminal device 1 displays the home screen and waits for user's pressing an application button other than the remote controller or checking the presence of a registered electric equipment 3 nearby. In Step S1711, in a case where an application button other than the remote controller is pressed, or it can be checked that a registered electric equipment is presented nearby. In a case where an application button other than the remote controller is pressed in Step S1711, the process proceeds to Step S1713. Alternatively, in a case where it can be checked that a registered electric equipment 3 is present nearby in Step S1712, the process proceeds to Step S1702. Whether or not a registered electric equipment 3 is present nearby can be checked, for example, based on whether or not the terminal device 1 is within the communication zone of the wireless router 4. Alternatively, it can be checked through a GPS, Wi-Fi Direct, Bluetooth, or the like.

In Step S1713, the terminal device 1 operates an application corresponding to the application button pressed by the user, and the user can execute an application operation in Step S1714. When the application operation ends, the process ends.

Step S1702 to Step S1707 are processes similar to Step S602 to Step S607 illustrated in FIG. 7. The position information and the height information of the terminal device 1 are acquired, an azimuth and an inclination from the terminal device 1 toward the electric equipment 3 are calculated, and the icon of an electric equipment 3 of which the azimuth and the inclination are closest to those of the casing of the terminal device 1 is displayed.

Next, in Step S1708, when an electric equipment 3 to be remotely controlled is selected by the user, the terminal device 1 causes the process to proceed to Step S1709. On the other hand, in a case where an electric equipment is not selected, the process is returned to Step S1711, and the process is continued.

Step S1709 to Step S1710 are processes similar to Step S609 to Step S610 illustrated in FIG. 7, and the terminal device 1 operates a corresponding remote controller application, and the user can execute a remote control operation of the electric equipment 3. When the remote control operation ends, the process ends.

Figure 20A:
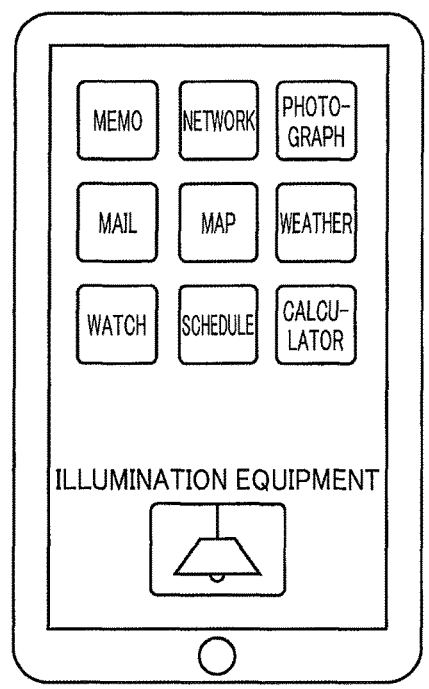
FIG. 20A is an example of display of a touch panel of the terminal device according to the fourth embodiment.
Figure 20B:
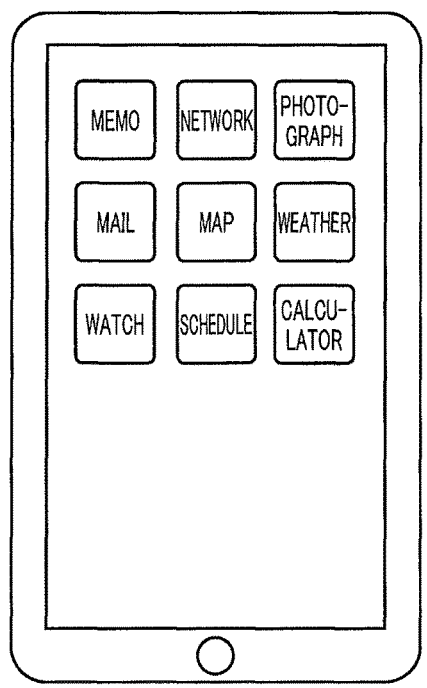
FIG. 20B is an example of display of a touch panel of the terminal device according to the fourth embodiment.

FIGS. 20A to 20D are examples of display of the touch panel of the terminal device 1. Among these, FIGS. 20A, 20C, and 20D are examples of display in Step S1707 illustrated in FIG. 19, and FIG. 20B is an example of display of a case where a determination made in Step S1712 illustrated in FIG. 19 is "N" illustrated in the drawing.

FIG. 20A is an example of the home screen of the terminal device 1, and icons of various applications are displayed on the touch panel. This example is also an example of display of the touch panel of a case where the terminal device 1 is placed toward the illumination equipment $3a1$, and, as a "remote control" icon of the electric equipment 3, an "illumination" icon is displayed.

FIG. 20B is an example of display of a case where it cannot be checked that a registered electric equipment 3 is present near the terminal device 1.

FIG. 20C is an example of display of the touch panel of a case where the terminal device 1 is placed toward the video monitor $3c1$, and, as a "remote controller" icon of the electric equipment 3, a "video monitor" icon is displayed.

FIG. 20D is an example of display of the touch panel of a case where the terminal device 1 is placed toward the disc player $3d1$, and, as a "remote controller" icon of the electric equipment 3, a "disc player" icon is displayed.

By employing the configuration described above, in the fourth embodiment, the same effects as those of the first embodiment can be acquired.

In addition, in a case where an electric equipment is present nearby, an icon of the electric equipment toward the terminal device is displayed on the home screen, and accordingly, the icon of a desired electric equipment can be quickly selected from among icons of a plurality of electric equipments.

[Embodiment 5]

In a fifth embodiment, operations of a case where the terminal device 1 has a lock state or a sleep state to be described hereinafter are added to the first embodiment.

Figure 21:
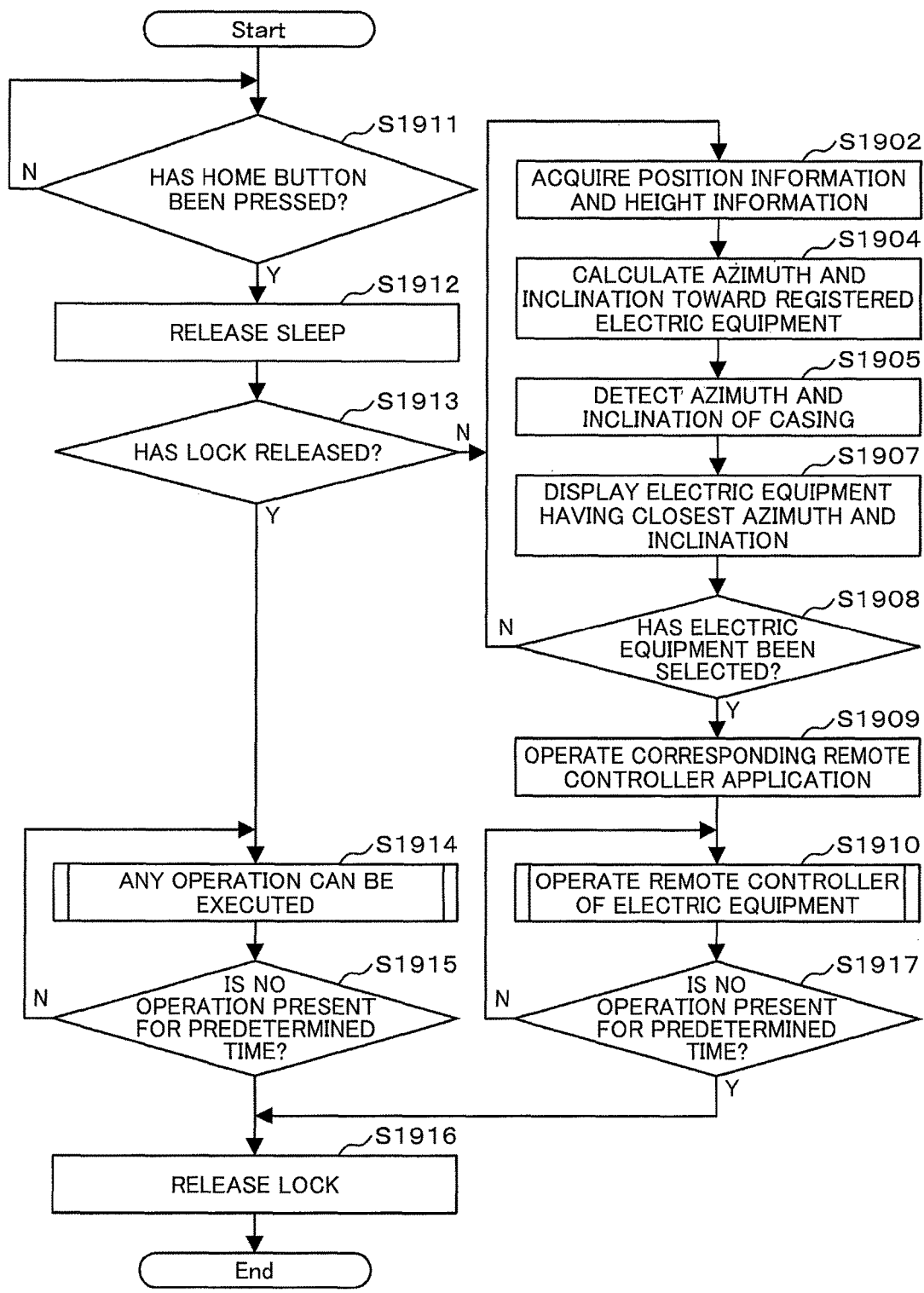
FIG. 21 is a flowchart that illustrates a process of selecting an electric equipment according to a fifth embodiment.

FIG. 21 is a flowchart that illustrates a process of selecting an electric equipment 3 executed by the terminal device 1 according to the fifth embodiment. This flowchart illustrated a process of selecting a desired remote controller application using the launcher application by operating an all-time launcher application on the screen of a locked state of the terminal device 1. The lock state described below represents a state in which the functions of the terminal device 1 are stopped except for a limited function. Here, the limited function is assumed to represent a function for remotely controlling the electric equipment 3. In addition, the sleep state described below represents a state in which almost all the functions of the terminal device 1 are stopped, and only a function for releasing the sleep state is available. Particularly, the sleep state is effective for preventing the consumption of the power of a battery that is built in the terminal device 1.

In Step S1911, the terminal device 1 waits for user's pressing the home button. At this time point, the terminal device 1 is assumed to be in the lock state and the sleep state. When the home button is pressed, the process proceeds to Step S1912, and the sleep state of the terminal device 1 is released.

Next, in Step S1913, switching between processes is executed based on whether or not the lock of the terminal device 1 is released according to user's password input or the like. When the lock of the terminal device 1 is released, the process proceeds to Step S1914. On the other hand, in a case where the lock of the terminal device 1 is not released, the process proceeds to Step S1902.

In Step S1914, the user can execute all the operations including a remote control operation of an electric equipment such as a mailing operation or a telephone call operation.

Next, in Step S1915, in a case where there is no operation for a predetermined time, the process proceeds to Step S1916, and the terminal device 1 is caused to be in the lock state and the sleep state, and the process ends.

Step S1902 to Step S1909 are processes similar to Step S602 to Step S609 illustrated in FIG. 7. The position information and the height information of the terminal device 1 are acquired, an azimuth and an inclination from the terminal device 1 toward the electric equipment 3 are calculated, and the icon of an electric equipment 3 of which the azimuth and the inclination are closest to those of the casing of the terminal device 1 is displayed (Step S1907), and, when the electric equipment 3 is selected, a corresponding remote controller application is operated.

Next, in Step S1910, the user can execute a remote control operation of the electric equipment 3.

Next, in Step S1917, in a case where there is no operation for a predetermined time, the process proceeds to Step S1916, and the terminal device 1 is caused to be in the lock state and the sleep state, and the process ends.

Figure 22A:
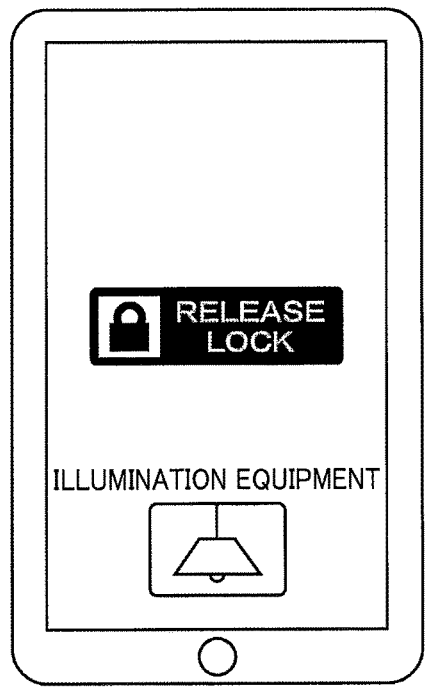
FIG. 22A is an example of display of a touch panel of the terminal device according to the fifth embodiment.
Figure 22B:
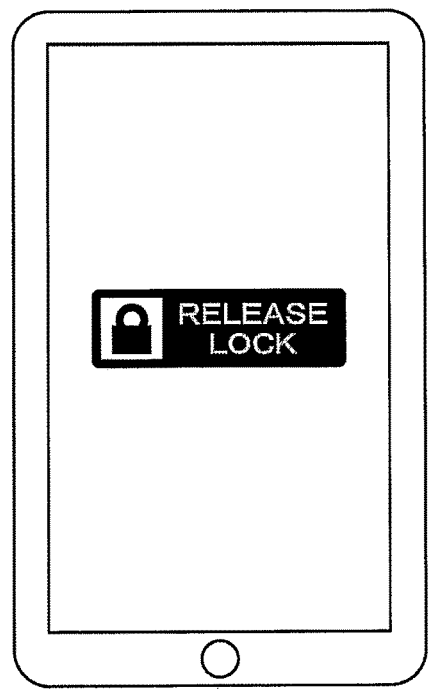
FIG. 22B is an example of display of a touch panel of the terminal device according to the fifth embodiment.
Figure 22C:
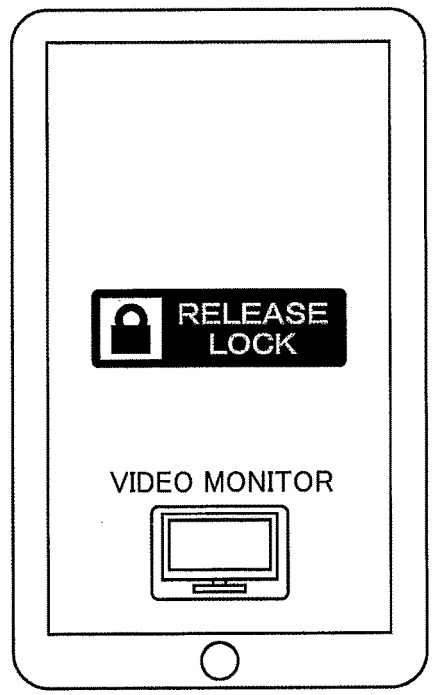
FIG. 22C is an example of display of a touch panel of the terminal device according to the fifth embodiment.
Figure 22D:
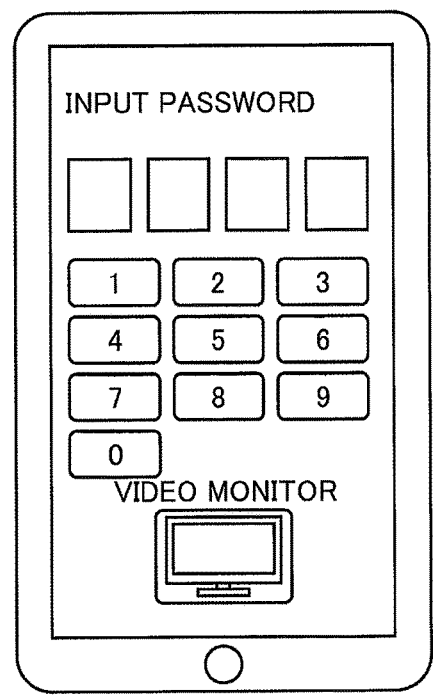
FIG. 22D is an example of display of a touch panel of the terminal device according to the fifth embodiment.

FIGS. 22A and 22D are examples of display of the touch panel of the terminal device 1 in Step S1907. FIG. 22A is an example of the lock screen of the terminal device 1, and an "illumination" icon is displayed as a "remote controller" icon of an electric equipment 3 of which the azimuth and the inclination are closest to those of the casing of the terminal device 1 on the touch panel. At this time, the illumination equipment 3a1 is present on an extended line of the azimuth and the inclination of the casing of the terminal device 1. By touching this "illumination" icon, the remote controller application can be operated. The terminal device 1 may be configured to display the "remote controller" icon as illustrated in FIG. 22A only inside the own house and not to display the "remote controller" icon outside the own house as illustrated in FIG. 22B. In such a case, the remote controller application is not operated by user's erroneous touch on the "remote controller" icon outside the own house. Whether the terminal device 1 is located inside the own house or outside the own house, for example, may be acquired by checking whether or not the terminal device 1 is present inside the communication zone of the wireless router 4. Alternatively, it can be checked using a GPS or the like.

FIG. 22C is an example of the lock screen of the terminal device 1, and a "video monitor" icon is displayed as a "remote controller" icon of an electric equipment 3 of which the azimuth and the inclination are closest to those of the casing of the terminal device 1 on the touch panel. At this time, the video monitor 3c1 is present on an extended line of the azimuth and the inclination of the casing of the terminal device 1.

In each of FIGS. 22A to 22C, an icon used for releasing the lock state of the terminal device 1 is displayed. When the user touches on this icon, a screen illustrated in FIG. 22D is displayed.

FIG. 22D is another example of the lock screen of the terminal device 1, a screen requesting the input of a password used for releasing the lock state is displayed, and, below the screen, as a "remote controller" icon of the electric equipment 3 of which the azimuth and the inclination are closest to those of the casing of the terminal device 1, a "video monitor" icon is displayed.

By employing the configuration described above, in the fifth embodiment, the same effects as those of the first embodiment can be acquired.

In addition, when the terminal device 1 is in the lock state, the icon of the electric equipment 3 toward which the terminal device 1 is placed is displayed on the display, and accordingly, the electric equipment 3 can be remotely controlled in a speedy manner without releasing the lock of the terminal device 1.

[Embodiment 6]

In a sixth embodiment, a function for accurately acquiring the height information of the terminal device 1 is added to the first embodiment.

FIG. 23 is a flowchart that illustrates a process of registering an electric equipment 3 executed by the terminal device 1 according to the sixth embodiment. Different from the registration process according to the first embodiment illustrated in FIG. 4, by using a situation formed when the terminal device 1 is placed at a place of a set height, more accurate height information is acquired.

In Step S2101 and Step S2111, the terminal device 1 waits until it can be checked whether or not the presence of an electric equipment 3 within the communication zone of the near field communication can be checked by the near field communication device 212 or whether or not a state in which the terminal device 1 is loaded on a charging stand used for charging the battery included in the terminal device 1 is formed. In a case where the presence of an electric equipment 3 within the communication zone can be checked, the process proceeds to Step S2102. In a case it can be checked that the terminal device is in the state of being loaded on the charging stand, the process proceeds to Step S2112.

In Step S2112, the height information of the terminal device 1 is acquired, and, in Step S2113, a difference value between the height information acquired in Step S2112 and a reference value is calculated, the process is returned to Step S2101, and the process is continued. As the reference value, the height information of the charging stand may be measured by using the height information acquiring unit 2809 at an initial stage of the use of the terminal device 1 and be registered, or "above sea-level of the floor position"+"a height (for example, 1 m) from the floor to the charging stand" may be registered.

For example, in a case where the height information is acquired by using the atmospheric pressure sensor, due to a rise or fall in the atmospheric pressure according to date and time, there is a possibility that accurate height information cannot be acquired. Since the charging stand is frequently placed at a set position, for example, by using a case where the terminal device 1 is placed on the charging stand, by acquiring the height information by measuring the atmospheric pressure at the same reference position (height), acquiring a difference from the reference value that is measured in advance, and correcting the measured value, for example, accurate height information with respect to the face of the floor of the room can be acquired.

Thus, the charging stand of the terminal device 1 is installed to a set place (for example, on a table having a height of 1 m from the floor) all the time, height information is acquired by measuring the atmospheric pressure each time of executing the charging process in Step S2112, and a difference value from the reference value is calculated in Step S2113.

Step S2102 and Step S2104 are processes similar to Step S302 and Step S304 illustrated in FIG. 4, and the terminal device 1 checks the identification information of the electric equipment 3 and acquires the position information and the height information.

Next, in Step S2114, the height information acquired in Step S2104 is corrected by using the difference value calculated in Step S2113. As mentioned in the description of Step S304 illustrated in FIG. 4, in Step S2104, the user operates the terminal device 1 near the electric equipment 3, and the acquired height information (approximately the same as the height information of the electric equipment 3) of the terminal device 1 is different from the height information measured in Step S2112 with the terminal device 1 being placed on the charging stand. However, in a case where there is no large difference in the date and time between Steps S2104 and S2112, by correcting the height information using the difference value, more accurate height information can be acquired in Step S2104.

Step S2105 to Step S2106 are processes similar to Step S305 to Step S306 illustrated in FIG. 4, and the terminal device 1 acquires the remote controller application of the electric equipment 3, registers various kinds of information that have been acquired in the list, and ends the process.

Figure 24:
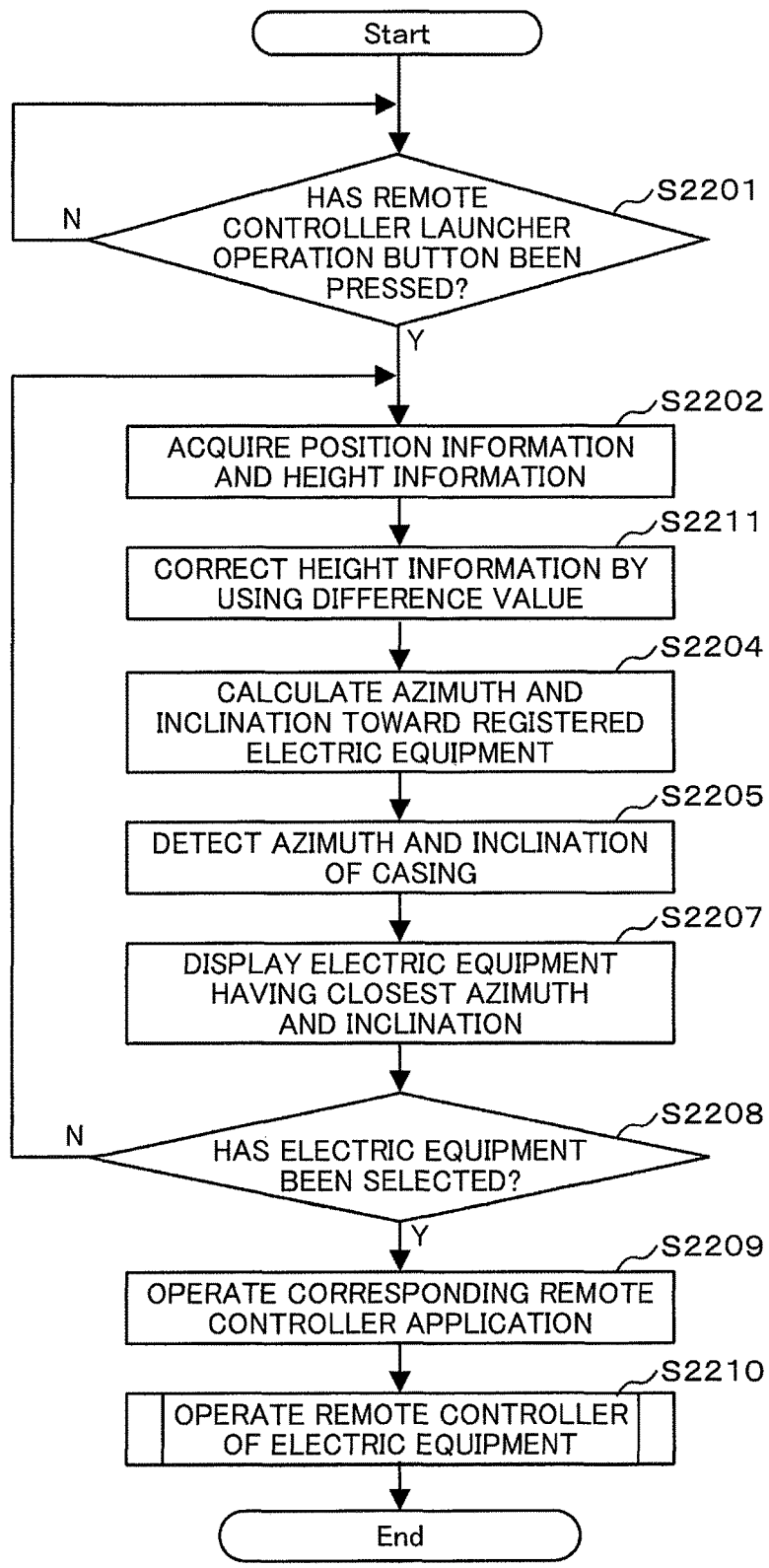
FIG. 24 is a flowchart that illustrates a process of selecting an electric equipment according to the sixth embodiment.

FIG. 24 is a flowchart that illustrates a process of selecting an electric equipment 3 executed by the terminal device 1 according to the sixth embodiment.

Step S2201 to Step S2202 are processes similar to Step S601 to Step S602 illustrated in FIG. 7, and, when a remote controller launcher operation button is pressed, the position information and the height information of the terminal device 1 are acquired.

Next, in Step S2211, the height information of the terminal device 1 that is acquired in Step S2202 is corrected using the difference value calculated in Step S2113 illustrated in FIG. 23.

Step S2204 to Step S2205 are processes similar to Step S604 to Step S605 illustrated in FIG. 7, an azimuth and an inclination from the terminal device 1 toward the electric equipment 3 are calculated, and the azimuth and the inclination of the casing of the terminal device 1 are detected.

Then, in Step S2207, similar to Step S607 illustrated in FIG. 7, the icon of an electric equipment 3 of which the azimuth and the inclination calculated in Step S2204 are closest to the azimuth and the inclination of the casing of the terminal device 1 is displayed on the user interface unit 2808. Alternatively, several electric equipments 3 having close azimuths and inclinations may be displayed.

Step S2208 to Step S2210 are processes similar to Step S608 to Step S610 illustrated in FIG. 7. When an electric equipment 3 is selected, the terminal device 1 operates a corresponding remote controller application, and the user can execute a remote control operation of the electric equipment 3.

In the embodiment described above, after the atmospheric pressure is converted into height information, the height information is corrected using the difference value from the reference value. However, a conversion coefficient used for converting the atmospheric pressure into the height information may be corrected based on the atmospheric pressure acquired at a reference position of which the height is known.

In addition, it may be configured such that an atmospheric pressure sensor, a LAN communication device, and the like are arranged on the charging stand, the atmospheric pressure is acquired and is transmitted to the terminal device 1, and a conversion coefficient used for converting the atmospheric pressure into the height information may be corrected. Furthermore, not a charging stand having a charging function but a reference device that includes an atmospheric pressure sensor, a LAN communication device, and the like and acquires the atmospheric pressure by using the installed place as a reference position and transmits the acquired atmospheric pressure to the terminal device 1 may be used. In addition, the atmospheric pressure at the reference device may be acquired and stored as a log, and the stored atmospheric pressure may be transmitted to the terminal device 1 upon request. Furthermore, an outdoor common reference device that includes a GPS and the like and transmits position information to the terminal device 1 together with atmospheric information such as atmospheric pressure, measurement time, an installed height, and the like may be arranged. At this time, the terminal device 1 searches for a reference device that is closest to the own house based on the position information and acquires the atmospheric pressure information.

In the embodiment described above, while an example in which the height information is corrected has been illustrated, the position information may be corrected. As described above, the position information is acquired, for example, by using a GPS, there are cases where it is difficult to detect absolute positions of a plurality of electric equipments arranged in a room having a limited size with high accuracy. Thus, the position information of each electric equipment may be corrected based on the position information acquired at a reference position.

By employing the configuration described above, in the sixth embodiment, the same effects as those of the first embodiment can be acquired.

In addition, the height information of the charging stand is re-acquired each time when the terminal device 1 is charged, a difference from the registered height information is acquired, and the height information is corrected using the difference, whereby accurate height information of the electric equipment 3 can be registered. When a remote control operation is executed, a desired electric equipment 3 can be correctly selected based on the accurate height information of the terminal device 1 and the electric equipment 3.

[Embodiment 7]

In a seventh embodiment, a function for accurately acquiring the height information of the terminal device 1 is added to the first embodiment. However, the content thereof is different from that of the sixth embodiment. While the height information of the electric equipment 3 is accurately registered, when the electric equipment 3 is selected by the terminal device 1, only the position information of the terminal device 1 is acquired for the selection.

FIG. 25 is a flowchart that illustrates a process of registering an electric equipment 3 executed by the terminal device 1 according to the seventh embodiment, and a process of correcting the height information is added to the registration process illustrated in FIG. 4.

Step S2301 to Step S2305 are processes similar to Step S301 to Step S305 illustrated in FIG. 4. When the presence of an electric equipment 3 within the near field communication zone can be checked, the terminal device 1 checks the identification information, acquires position information and height information, and acquires a remote controller application.

Next, in Step S2311, the terminal device 1 checks whether or not a registered electric equipment 3 is present in the list. In a case where a registered electric equipment 3 is present, the process proceeds to Step S2312. On the other hand, in a case where no registered electric equipment 3 is present, the process proceeds to Step S2306.

In Step S2312, the terminal device 1 instructs the user to place the terminal device 1 to approach the electric equipment 3 that has already been registered, for example, by using the user interface unit 2708. In Step S2313, the terminal device 1 waits until the presence of an electric equipment 3 within the communication zone of the near field communication can be checked. In a case where the presence of an electric equipment 3 within the communication zone can be checked, the process proceeds to Step S2314, and the terminal device 1 checks the identification information and, in Step S2315, checks whether or not the electric equipment 3 has been registered in the list. In a case where the electric equipment 3 has been registered in the list, the process proceeds to Step S2316. On the other hand, in a case where the electric equipment 3 has not been registered, the process is returned to Step S2312, and the process is continued.

In Step S2316, the terminal device 1 acquires the height information by using the height information acquiring unit 2709. At this time, since the electric equipment 3 is located at the same position as that of the terminal device 1, the acquired height information is the height information of the electric equipment 3.

Next, in Step S2317, a difference value between the height information acquired in Step S2316 and the height information registered in the list is calculated.

For example, in a case where the height information is acquired by using the atmospheric pressure sensor, due to a rise or fall in the atmospheric pressure according to date and time, there is a possibility that accurate height information cannot be acquired. Thus, the height information is reacquired by measuring the atmospheric pressure at the position of another electric equipment 3 registered in the list (the height information has been acquired in the past), and a correction is made using the difference thereof, whereby accurate height information can be acquired.

Thus, the height information is acquired by measuring the atmospheric pressure at the position of the electric equipment 3 registered in the list in Step S2316, and a difference value from the height information registered in the list is calculated in Step S2317.

Next, in Step S2318, the height information acquired in Step S2304 is corrected using the difference value calculated in Step S2317.

Step S2306 is a process similar to Step S306 illustrated in FIG. 4, and the terminal device 1 registers various kinds of information that have been acquired in the list and ends the process.

In the embodiment described above, while an example in which the height information is corrected has been illustrated, the position information may be corrected.

Figure 26:
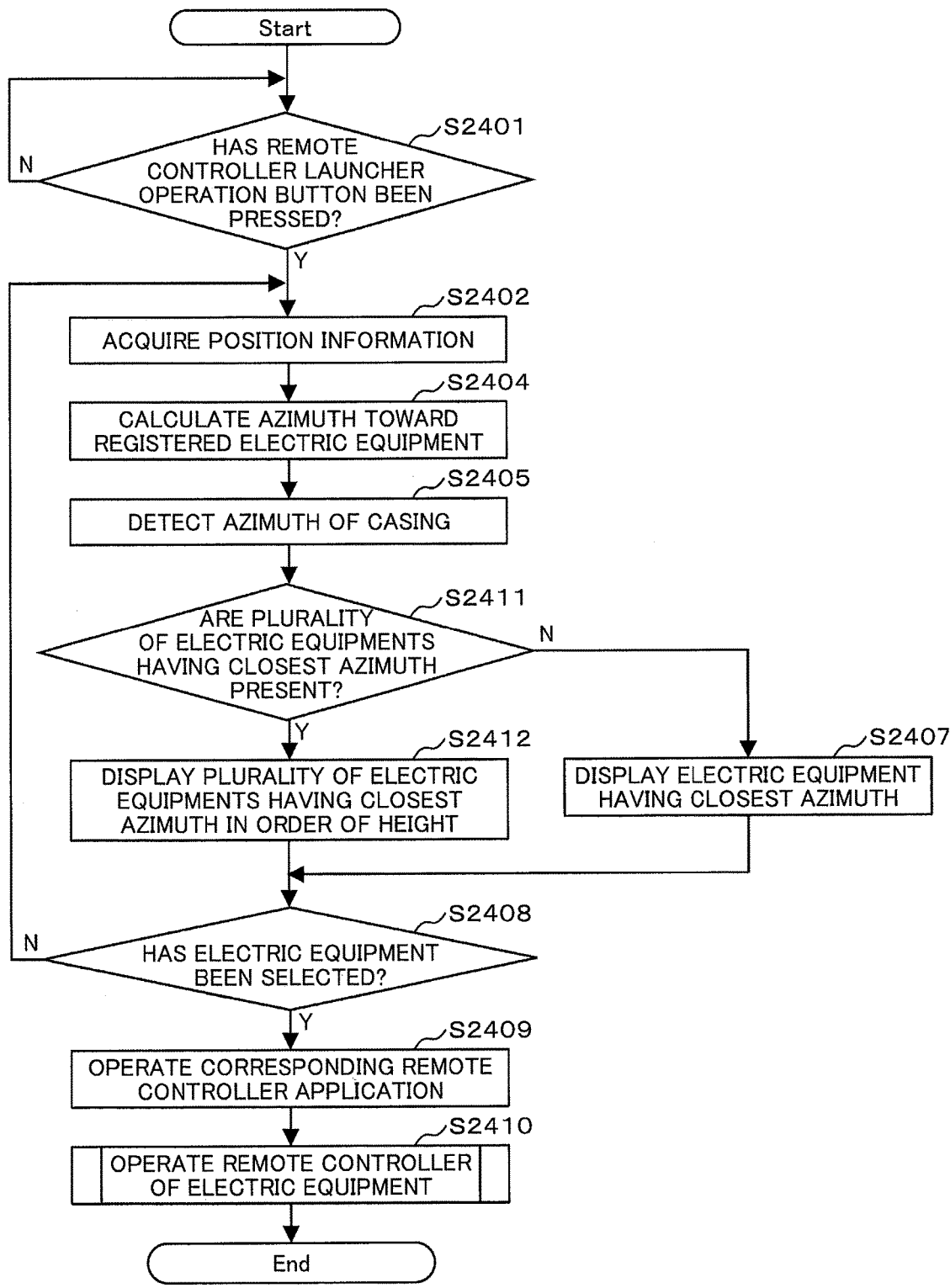
FIG. 26 is a flowchart that illustrates a process of selecting an electric equipment according to the seventh embodiment.

FIG. 26 is a flowchart that illustrates a process of selecting an electric equipment 3 executed by the terminal device 1 according to the seventh embodiment. This flowchart illustrates a process of selecting a desired remote controller application by using a launcher application.

Step S2401 is a process similar to Step S601 illustrated in FIG. 7, and the process waits for the remote controller launcher operation button being pressed by the user.

Next, the process proceeds to Step S2402, and the terminal device 1 acquires the position information of the terminal device 1 by using the position information acquiring unit 2703. The acquired position information represents the current position of the terminal device 1 at the timing when the remote controller operation button is pressed.

In Step S2404, the azimuths from the terminal device 1 toward all the registered electric equipments 3 are calculated. The azimuth from the terminal device 1 toward each electric equipment 3 is acquired based on the position information of the registered electric equipment 3 and the current position information of the terminal device 1.

In Step S2405, the azimuth of the casing of the terminal device 1 is detected by using the casing azimuth detecting unit 2705. At this time, the user places the terminal device 1 toward an electric equipment 3 desired to be remotely controlled.

Next, in Step S2411, the process is switched based on whether or not a plurality of electric equipments 3 having closest azimuths are present. In a case where a plurality of electric equipments 3 having the closest azimuths are present, the process proceeds to Step S2412. On the other hand, in a case where a plurality of electric equipments 3 having the closest azimuths are not present, in other words, in a case where there is one electric equipment 3 located at a same position, the process proceeds to Step S2407.

In Step S2407, the icon of the electric equipment 3 of which the azimuth calculated in Step S2404 is closest to the azimuth of the casing of the terminal device 1 is displayed on the user interface unit 2808.

FIGS. 27A to 27C are examples of display of the touch panel of the terminal device 1.

FIG. 27A is an example of display of the touch panel of a case where the terminal device 1 is placed toward an illumination equipment 3a1. An icon of the illumination equipment is displayed on the touch panel, and it represents that the illumination equipment 3a1 is present at the azimuth at which the terminal device 1 is placed.

FIG. 27B is an example of display of the touch panel of a case where the terminal device 1 is placed toward an air conditioner 3b1. An icon of the air conditioner is displayed on the touch panel, and it represents that the air conditioner 3b1 is present at the azimuth at which the terminal device 1 is placed.

In Step S2412, the icons of the plurality of electric equipments 3 of which the azimuths calculated in Step S2404 are closest to the azimuth of the casing of the terminal device 1 are displayed on the user interface unit 2808 in order of installation height.

FIG. 27C is an example of display of the touch panel of a case where the terminal device 1 is placed toward a video monitor 3c1. On the touch panel, icons of the video monitor and the disc player are displayed, and it represents that the video monitor 3c1 and the disc player 3d1 are present at the azimuth at which the terminal device 1 is placed. Since the installation height of the video monitor 3c1 is higher than that of the disc player 3d1, the icon of the video monitor is displayed above the icon of the disc player.

Next, in Step S2408, when an electric equipment 3 to be remotely controlled is selected by the user, the terminal device 1 causes the process to proceed to Step S2409. On the other hand, in a case where an electric equipment is not selected, the process is returned to Step S2402, and the process is continued.

Step S2409 to Step S2410 are processes similar to Step S609 to Step S610 illustrated in FIG. 7, and the terminal device 1 operates a corresponding remote controller application, and the user can execute a remote control operation of the electric equipment 3. When the remote control operation ends, the process ends.

By employing the configuration described above, in the seventh embodiment, the same effects as those of the first embodiment can be acquired.

In addition, when an electric equipment is registered, the height information of another electric equipment that has been registered is re-acquired, a difference from the registered height information is acquired, and the height information of the electric equipment to be registered is corrected using the difference, whereby accurate height information of the electric equipment can be registered.

Furthermore, the electric equipment 3 is specified based on the position information of the electric equipment 3 and the position information of the terminal device 1, and, in a case where a plurality of electric equipments 3 are present at a same position, the icons of the electric equipments 3 are displayed in order of height based on the height information of the electric equipments 3. Accordingly, for example, also in a case where the acquisition accuracy of the height information is low, an icon of a desired electric equipment can be quickly selected from among the plurality of electric equipments.

[Embodiment 8]

In an eighth embodiment, a function for accurately acquiring the height information of the terminal device 1 is added to the first embodiment. However, the content thereof is different from those of the sixth and seventh embodiments.

Figure 28:
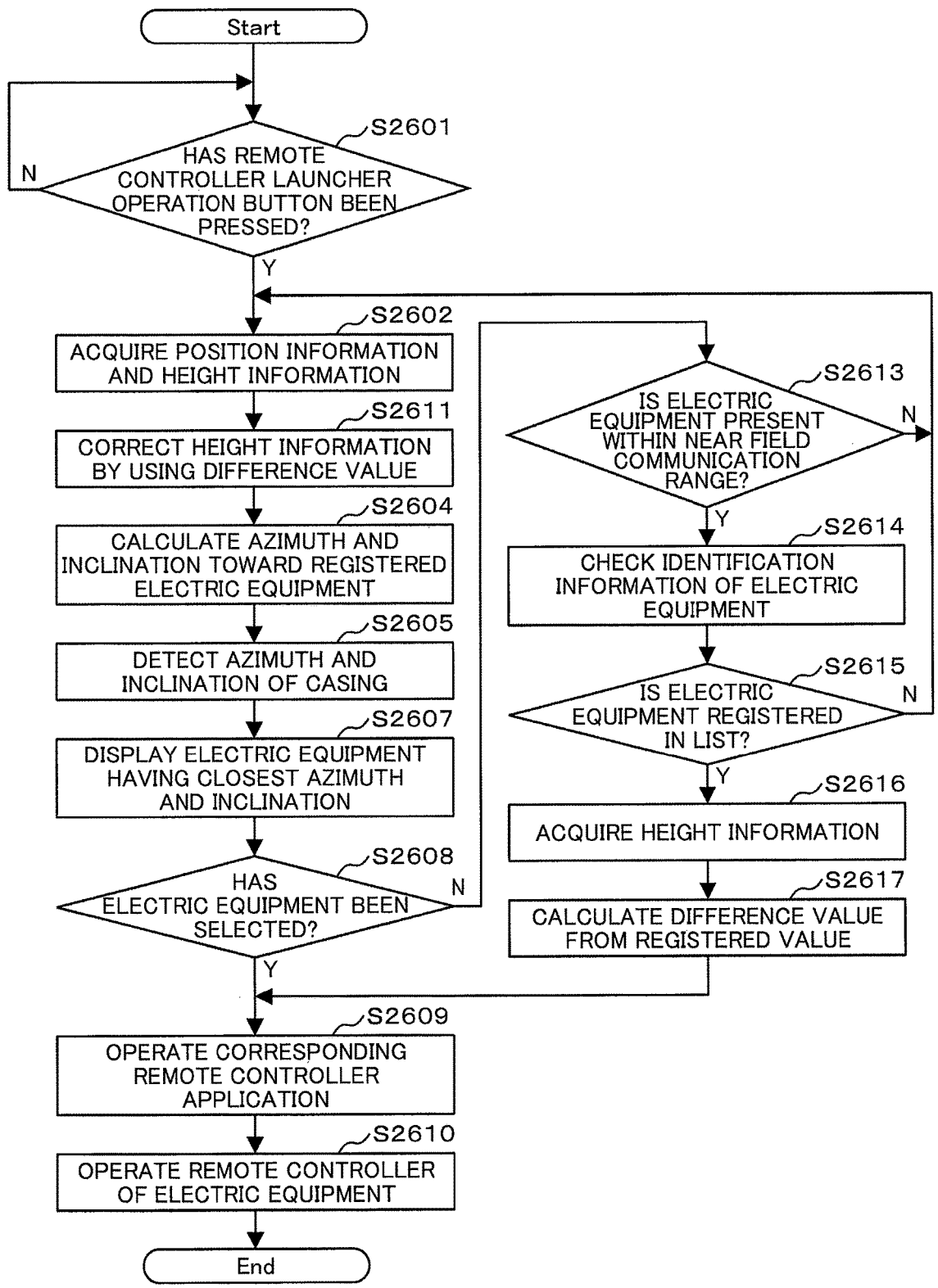
FIG. 28 is a flowchart that illustrates a process of selecting an electric equipment according to an eighth embodiment.

FIG. 28 is a flowchart that illustrates a process of selecting an electric equipment 3 executed by the terminal device 1 according to the eighth embodiment.

Step S2601 to Step S2602 are processes similar to Step S601 to Step S602 illustrated in FIG. 7, and, when a remote controller launcher operation button is pressed, the position information and the height information of the terminal device 1 are acquired.

Next, in Step S2611, the height information acquired in Step S2602 is corrected using a difference value calculated in Step S2617 to be described later. However, the correction is made only after the difference value is calculated in Step S2617.

Step S2604 to Step S2605 are processes similar to Step S604 to Step S605 illustrated in FIG. 7, an azimuth and an inclination from the terminal device 1 toward the electric equipment 3 are calculated, and the azimuth and the inclination of the casing of the terminal device 1 are detected.

Then, in Step S2607, the icon of an electric equipment 3 of which the azimuth and the inclination calculated in Step S2604 are closest to the azimuth and the inclination of the casing of the terminal device 1 is displayed on the user interface unit 2808. Alternatively, several electric equipments 3 having close azimuths and inclinations may be displayed.

Next, in Step S2608, when an electric equipment 3 to be remotely controlled is selected by the user, the process proceeds to Step S2609. On the other hand, in a case where an electric equipment is not selected, the process proceeds to Step S2613.

In Step S2613, in a case where the electric equipment 3 is present within the near field communication zone, the process proceeds to Step S2614. On the other hand, in a case where no electric equipment 3 is present, the process is returned to Step S2602, and the process is continued.

In Step S2614, the identification information is checked, and, in Step S2615, it is checked whether or not the electric equipment 3 has been registered in the list. In a case where the electric equipment 3 has been registered in the list, the process proceeds to Step S2616. On the other hand, in a case where the electric equipment has not been registered, the process is returned to Step S2602, and the process is continued.

In Step S2616, the height information is acquired by using the height information acquiring unit 2709. At this time, the user places the electric equipment 3 at the same position as that of the terminal device 1, and accordingly, the acquired height information is the height information of the electric equipment 3.

Next, in Step S2617, a difference value between the height information acquired in Step S2616 and the height information registered in the list is calculated. The calculated difference value is used when the height information is corrected in previous Step S2611.

Step S2609 to Step S2610 are processes similar to Step S609 to Step S610 illustrated in FIG. 7, and the terminal device 1 operates a corresponding remote controller application, and the user can execute a remote control operation of the electric equipment 3.

In the embodiment described above, while an example in which the height information is corrected has been illustrated, the position information may be corrected.

By employing the configuration described above, in the eighth embodiment, the same effects as those of the first embodiment can be acquired.

In addition, when an electric equipment to be remotely controlled is selected, in a case where a desired electric equipment cannot be selected well due to no correction of the height information or the like, the desired electric equipment can be directly selected through near field communication or the like. Furthermore, at this time, since the height information is corrected, in a subsequent remote control operation, based on the accurate height information of the terminal device and the electric equipment, a desired electric equipment can be accurately selected.

[Embodiment 9]

In a ninth embodiment, a function for switching between remote control operations of the terminal device 1 is added to the first embodiment.

Figure 29:
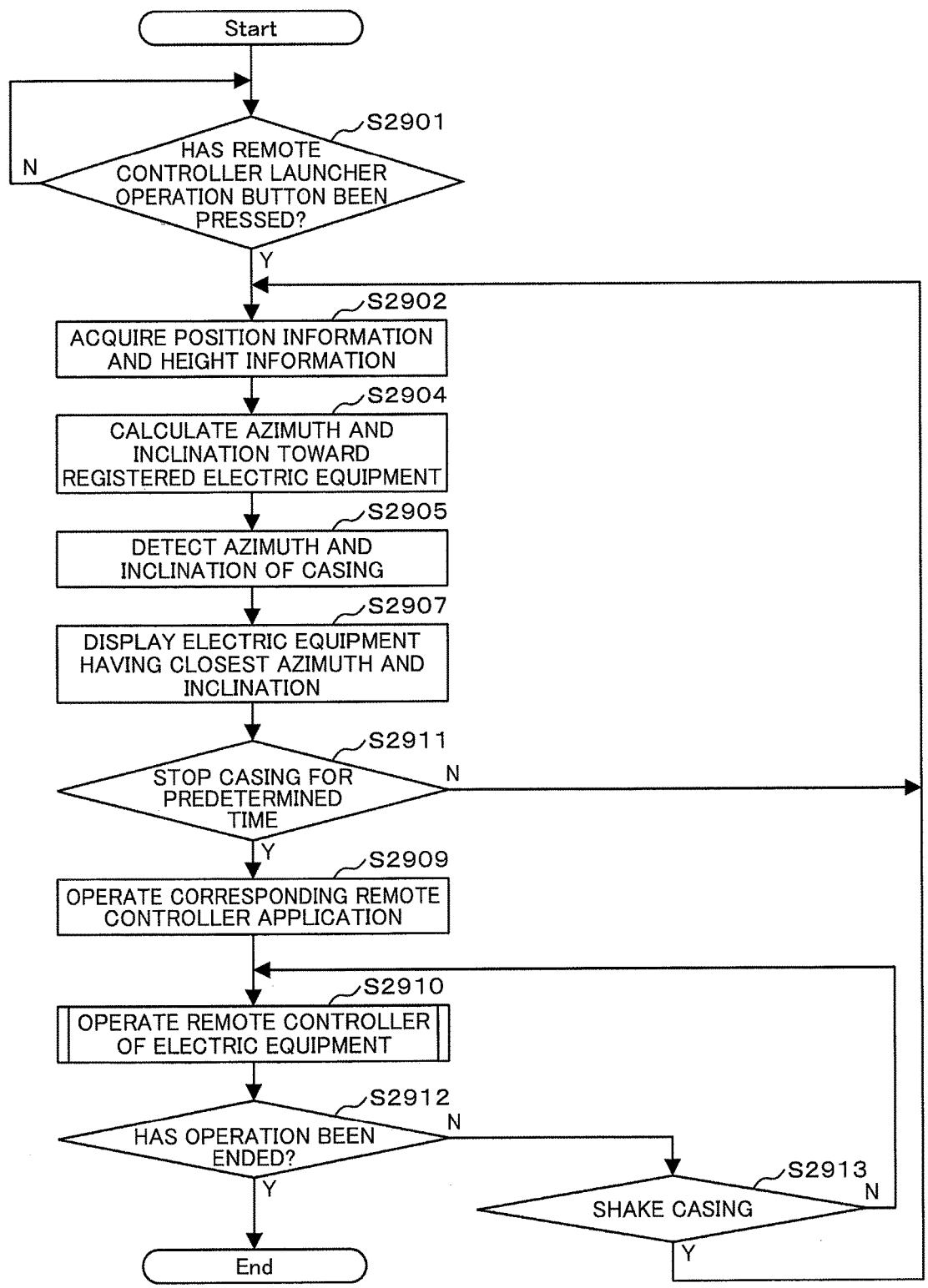
FIG. 29 is a flowchart that illustrates a process of selecting an electric equipment according to a ninth embodiment.

FIG. 29 is a flowchart that illustrates a process of selecting an electric equipment 3 executed by the terminal device 1 according to the ninth embodiment.

Step S2901 to Step S2907 are processes similar to Step S601 to Step S607 illustrated in FIG. 7, and, when a remote controller launcher operation button is pressed, the position information and the height information of the terminal device 1 are acquired, an azimuth and an inclination from the terminal device 1 toward the electric equipment 3 are calculated, and the icon of an electric equipment 3 of which the azimuth and the inclination that have been calculated are closest to those of the casing of the terminal device 1 is displayed on the user interface unit 2808.

Next, in Step S2911, in a case where the casing of the terminal device 1 is stopped for a predetermined time (for example, two seconds), the process proceeds to Step S2909. On the other hand, in a case where the casing of the terminal device 1 is not stopped, the process is returned to Step S2902, and the process is continued. Whether or not the casing of the terminal device 1 is stopped can be detected by using the acceleration sensor 205 or the like. In other words, the terminal device 1 determines that the user gives an instruction for operating the electric equipment displayed in Step S2907 in a case where the casing of the terminal device 1 is stopped by the user, determines that the user gives an instruction for operating an electric equipment other than that displayed in Step S2907 in a case where the casing of the terminal device is moved, and executes operations corresponding thereto.

Step S2909 to Step S2910 are processes similar to Step S609 to Step S610 illustrated in FIG. 7, and the terminal device 1 operates a corresponding remote controller application, and the user can execute a remote control operation of the electric equipment 3.

Next, in Step S2912, the process ends in a case where the remote control operation is ended, and the process proceeds to Step S2913 in a case where the remote control operation is not ended. The ending of the remote control operation, for example, is executed by the user pressing the home button of the terminal device 1.

In Step S2913, in a case where the casing of the terminal device 1 has been shaken (vibrated) by the user, the process is returned to Step S2902, and the process is continued. On the other hand, in a case where the casing of the terminal device has not been shaken, the process is returned to Step S2910, and the remote control operation of the same electric equipment is continued. Whether or not the casing of the terminal device 1 has been shaken can be determined by detecting a vibration using the acceleration sensor 205 or the like. In other words, the terminal device 1 determines that the user gives an instruction for continuously operating the electric equipment displayed in Step S2907 in a case where the casing of the terminal device 1 has not been shaken by the user, determines that the user gives an instruction for operating an electric equipment other than that displayed in Step S2907 in a case where the casing of the terminal device has been shaken, and executes operations corresponding thereto.

According to the configuration described above, in the ninth embodiment, the same effects as those of the first embodiment can be acquired.

In addition, by only stopping the casing of the terminal device toward the electric equipment desired to be remotely controlled for a predetermined time, a desired electric equipment can be selected. In addition, by shaking the casing of the terminal device, another electric equipment can be selected.

The embodiments described above have been described in detail for easy understanding of the present invention, and thus, all the configurations that have been described do not necessarily need to be included. In addition, a part of the configuration of a certain embodiment may be replaced with the configuration of another embodiment, and the configuration of another embodiment may be added to the configuration of a certain embodiment. Furthermore, for a part of the configuration of each embodiment, the addition/removal/replacement of another configuration may be made.

A part or the whole of each configuration, each function, each processing unit, each processing means, or the like described above may be realized by hardware, for example, by being designed as an integrated circuit or the like. In addition, each configuration, each function, or the like described above may be realized by software as a processor analyzes and executes a program realizing each function. A program realizing each function and information such as a table, a file, or the like may be recorded in a recording device such as a memory, a hard disk, or a Solid State Drive (SSD) or a recording medium such as an IC card or an SD card.

In addition, while control lines and indication lines that are considered to be necessary for the description are illustrated, it cannot be determined that all the control lines and indication lines are not necessarily illustrated as a product. Actually, most of the configurations may be considered to be connected to each other.

REFERENCE SIGNS LIST

1 Terminal device
2 Remote controller
3 Electric equipment
4 Wireless router
5 Network

The invention claimed is:

1. A terminal device that remotely controls a plurality of electric equipment, the terminal device comprising:
   a position information acquiring unit that acquires position information of the terminal device;
   a height information acquiring unit that acquires height information of the terminal device;
   an azimuth detecting unit that detects an azimuth toward which the terminal device is placed;
   an inclination detecting unit that detects an inclination of the terminal device;
   a storage unit that stores position information and height information of the plural electric equipment acquired from the electric plural equipment; and
   a control unit that remotely controls an electric equipment selected from the plural electric equipment,
   wherein the control unit is programmed to:
   calculate azimuths of the plural electric equipment toward the terminal device based on the position information of the terminal device acquired by the position information acquiring unit and the position information of the plural electric equipment stored in the storage unit;
   calculate inclinations of the plural electric equipment toward the terminal device based on the height information of the terminal device acquired by the height information acquiring unit and the height information of the plural electric equipment stored in the storage unit; and
   compare the calculated azimuths of the plural electric equipment with the azimuth toward which the terminal device is placed, compare the calculated inclinations of the plural electric equipment with the inclination of the terminal device, and select the electric equipment having the respective azimuth within a predetermined azimuth range of the azimuth of the terminal device and the respective inclination within a predetermined inclination range of the inclination of the terminal device as the electric equipment to be remotely controlled.

2. The terminal device according to claim 1, further comprising:
a near field communication unit that communicates with one or more of the plural electric equipment present within a predetermined distance,
wherein one or more display images representing types of the one or more electric equipment are supplied through the near field communication unit and stored in the storage unit.

3. The terminal device according to claim 2, further comprising
a user interface unit that displays information for a user,
wherein the control unit is further programmed to display an image representing a type of the selected electric equipment from among the one or more stored display images on the user interface unit.

4. The terminal device according to claim 1,
wherein the control unit is further programmed to:
calculate distances of the plural electric equipment with respect to the terminal device based on the position information of the terminal device acquired by the position information acquiring unit and the position information of the plural electric equipment stored in the storage unit, and
select the electric equipment to be remotely controlled further based on the calculated distances.

5. The terminal device according to claim 4, wherein the control unit is further programmed to select the electric equipment having a respective calculated distance that is within a predetermined distance.

6. The terminal device according to claim 4, wherein the control unit is further programmed to select the electric equipment having a respective calculated distance which is smallest among the calculated distances.

7. The terminal device according to claim 1, wherein the control unit is further programmed to:
replace the position information of the terminal device with predetermined position information when the position information of the terminal device acquired by the position information acquiring unit and the position information of the electric equipment stored in the storage unit are separated from each other by a first predetermined distance or more, and
replace the height information of the terminal device with predetermined height information when the height information of the terminal device acquired by the height information acquiring unit and the height information of the electric equipment stored in the storage unit are separated from each other by a second predetermined distance or more.

8. The terminal device according to claim 1,
wherein, for a first electric equipment of the plural electric equipment, a first position and a first height of the terminal device when a user places the terminal device to approach the first electric equipment are stored as the position information and the height information of the first electric equipment in the storage unit, and
wherein, for a second electric equipment of the plural electric equipment other than the first electric equipment, a second position and a second height information of the first electric equipment are acquired a second time when the user places the terminal device to approach the first electric equipment, differences between the first position and the second position and between the first height and the second height of the first electric equipment are acquired, and the position information and the height information of the second electric equipment stored in the storage unit are corrected based on the differences.

9. A terminal device that remotely controls a plurality of electric equipment, the terminal device comprising:
a position information acquiring unit that acquires position information of the terminal device;
an azimuth detecting unit that detects an azimuth toward which the terminal device is placed;
a storage unit that stores position information and height information of the plural electric equipment acquired from the plural electric equipment; and
a user interface unit that displays information for a user; and
a control unit that remotely controls an electric equipment selected from the plural electric equipment,
wherein the control unit is programmed to:
calculate azimuths of the plural electric equipment toward the terminal device based on the position information of the terminal device acquired by the position information acquiring unit and the position information of the electric equipment stored in the storage unit;
compare the calculated azimuths of the plural electric equipment with the azimuth toward which the terminal device is placed and display a plurality of images representing respective types of the plural electric equipment having the calculated azimuths that are within a predetermined azimuth range on the user interface unit in order of the height information of the plural electric equipment stored in the storage unit; and
select the electric equipment to be remotely controlled from the plural electric equipment and which corresponds to one of the images on the display selected by the user.

10. The terminal device according to claim 1, further comprising:
a vibration detecting unit that detects whether or not the terminal device vibrates,
wherein the control unit is further programmed to select the electric equipment to be remotely controlled after the vibration detecting unit detects a vibration.

11. A remote control method used in a terminal device that remotely controls a plurality of electric equipment, the remote control method comprising:
acquiring position information of the terminal device;
acquiring height information of the terminal device;
detecting an azimuth toward which the terminal device is placed;
detecting an inclination of the terminal device;
storing position information and height information of the plural electric equipment acquired from the plural electric equipment; and
remotely controlling an electric equipment selected from the plural electric equipment,
the remotely controlling of the electric equipment including:
calculating azimuths of the plural electric equipment toward the terminal device based on the position information of the terminal device and the position information of the plural electric equipment;
calculating inclinations of the plural electric equipment toward the terminal device based on the height information of the terminal device and the height information of the plural electric equipment; and comparing the calculated azimuths of the plural electric equipment with the azimuth toward which the terminal device is placed, comparing the calculated inclinations of the plural electric equipment with the inclination of the terminal device, and selecting the electric equipment having the respective azimuth within a predetermined azimuth range of the azimuth of the terminal device and the respective inclination within a predetermined inclination range of the inclination of the terminal device as the electric equipment to be remotely controlled.

12. The remote control method according to claim 11, further comprising:
acquiring information of the plural electric equipment;
wherein the position information and the height information of the plural electric equipment are stored in association with the identification information of the plural electric equipment.

* * * * *